United States Patent
Ota et al.

(10) Patent No.: US 10,491,828 B2
(45) Date of Patent: Nov. 26, 2019

(54) DISPLAY CONTROL APPARATUS AND CONTROL METHOD OF THE SAME

(71) Applicant: CANON KABUSHIKI KAISHA, Tokyo (JP)

(72) Inventors: Tomohiro Ota, Kawasaki (JP); Soushi Takita, Kawasaki (JP); Koichi Okada, Kunitachi (JP); Masaaki Kano, Kawasaki (JP); Hidetaka Uemura, Kawasaki (JP); Satoshi Ishimaru, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 15/083,103

(22) Filed: Mar. 28, 2016

(65) Prior Publication Data

US 2016/0295120 A1  Oct. 6, 2016

(30) Foreign Application Priority Data

Apr. 3, 2015 (JP) ................................. 2015-077206
Apr. 3, 2015 (JP) ................................. 2015-077207

(Continued)

(51) Int. Cl.
*H04N 5/232* (2006.01)
*G03B 13/00* (2006.01)

(52) U.S. Cl.
CPC ..... *H04N 5/23293* (2013.01); *H04N 5/23212* (2013.01); *H04N 5/23219* (2013.01); *H04N 5/23222* (2013.01); *H04N 5/23245* (2013.01)

(58) Field of Classification Search
CPC ........... H04N 5/23212; H04N 5/23293; H04N 5/232127; H04N 5/232933;
(Continued)

(56) References Cited

U.S. PATENT DOCUMENTS

2006/0055814 A1  3/2006 Okawa
2012/0314116 A1* 12/2012 Jannard ................. G03B 13/18
348/333.02
(Continued)

FOREIGN PATENT DOCUMENTS

CN  101098405 A  1/2008
JP  2001208961 A  8/2001
(Continued)

*Primary Examiner* — Sinh Tran
*Assistant Examiner* — Selam T Gebriel
(74) *Attorney, Agent, or Firm* — Canon U.S.A., Inc. I.P. Division

(57) ABSTRACT

Included are a display control unit configured to display a live view image being imaged by an imaging unit, and to display a display item indicating a degree of in-focus, superimposed on the live view image; an acquiring unit configured to acquire information relating to a degree of in-focus in a focus detecting region; and a changing unit configured to change display positions and display forms of a first indicator and second indicator that indicate a degree of in-focus by a positional display relationship with each other, and a third indicator that indicates a focus position, based on information acquired by the acquiring unit, the first indicator and the second indicator and the third indicator are included in the display item.

9 Claims, 23 Drawing Sheets

(30) Foreign Application Priority Data

| | | |
|---|---|---|
| Apr. 3, 2015 | (JP) | 2015-077208 |
| Apr. 3, 2015 | (JP) | 2015-077209 |
| Apr. 3, 2015 | (JP) | 2015-077210 |

(58) Field of Classification Search
CPC ......... H04N 5/232939; H04N 5/22525; H04N 5/2251; H04N 5/2252; H04N 5/22521; H04N 5/225; G03B 21/53; G03B 13/00–13/36
See application file for complete search history.

(56) References Cited

U.S. PATENT DOCUMENTS

| | | | | |
|---|---|---|---|---|
| 2014/0375871 | A1* | 12/2014 | Takagi | H04N 5/23212 348/349 |
| 2015/0103223 | A1* | 4/2015 | Park | H04N 5/23212 348/333.12 |

FOREIGN PATENT DOCUMENTS

| | | | |
|---|---|---|---|
| JP | 2001309210 | A | 11/2001 |
| JP | 2002209134 | A | 7/2002 |
| JP | 2002-365710 | A | 12/2002 |
| JP | 2003140247 | A | 5/2003 |
| JP | 2005-175683 | A | 6/2005 |
| JP | 2006323374 | A | 11/2006 |
| JP | 2007248507 | A | 9/2007 |
| JP | 2007-279334 | A | 10/2007 |
| JP | 2008079124 | A | 4/2008 |
| JP | 2009044682 | A | 2/2009 |
| JP | 2009055160 | A | 3/2009 |
| JP | 2009118083 | A | 5/2009 |
| JP | 2009147665 | A | 7/2009 |
| JP | 2009237214 | A | 10/2009 |
| JP | 2011-039206 | A | 2/2011 |
| JP | 2013-201527 | A | 10/2013 |
| JP | 2014519052 | A | 8/2014 |
| JP | 2015004960 | A | 1/2015 |
| KR | 10-2012-0026977 | A | 3/2012 |

\* cited by examiner

FIG. 2A

| R | Gr | R | Gr | R | Gr | R | Gr | R | Gr |
|---|----|---|----|---|----|---|----|---|----|
| Gb | B | Gb | B | Gb | B | Gb | B | Gb | B |

FIG. 2B

| R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B |
|---|---|---|---|---|---|---|---|---|---|---|---|---|---|---|---|---|---|---|---|
| Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B |

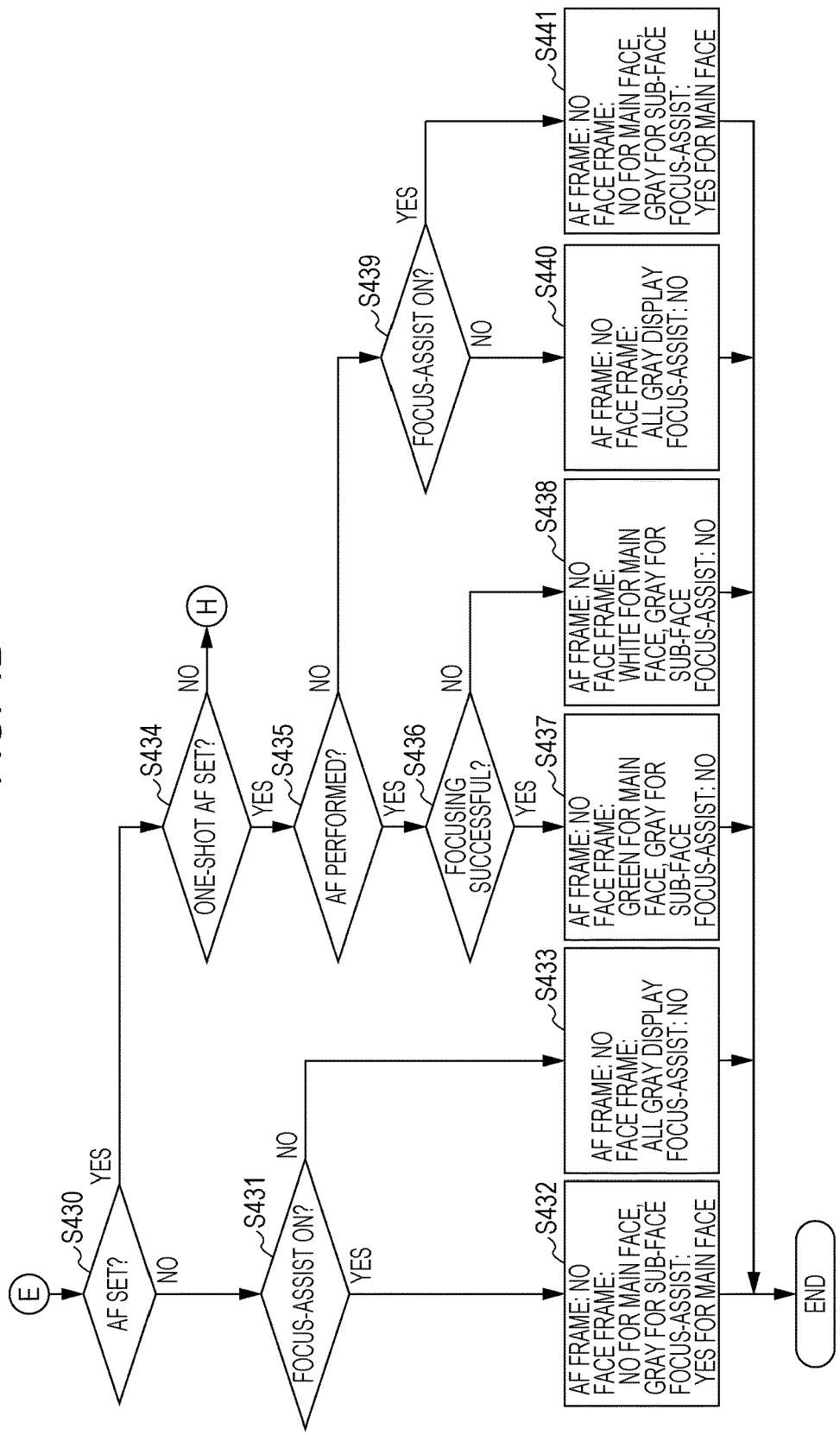

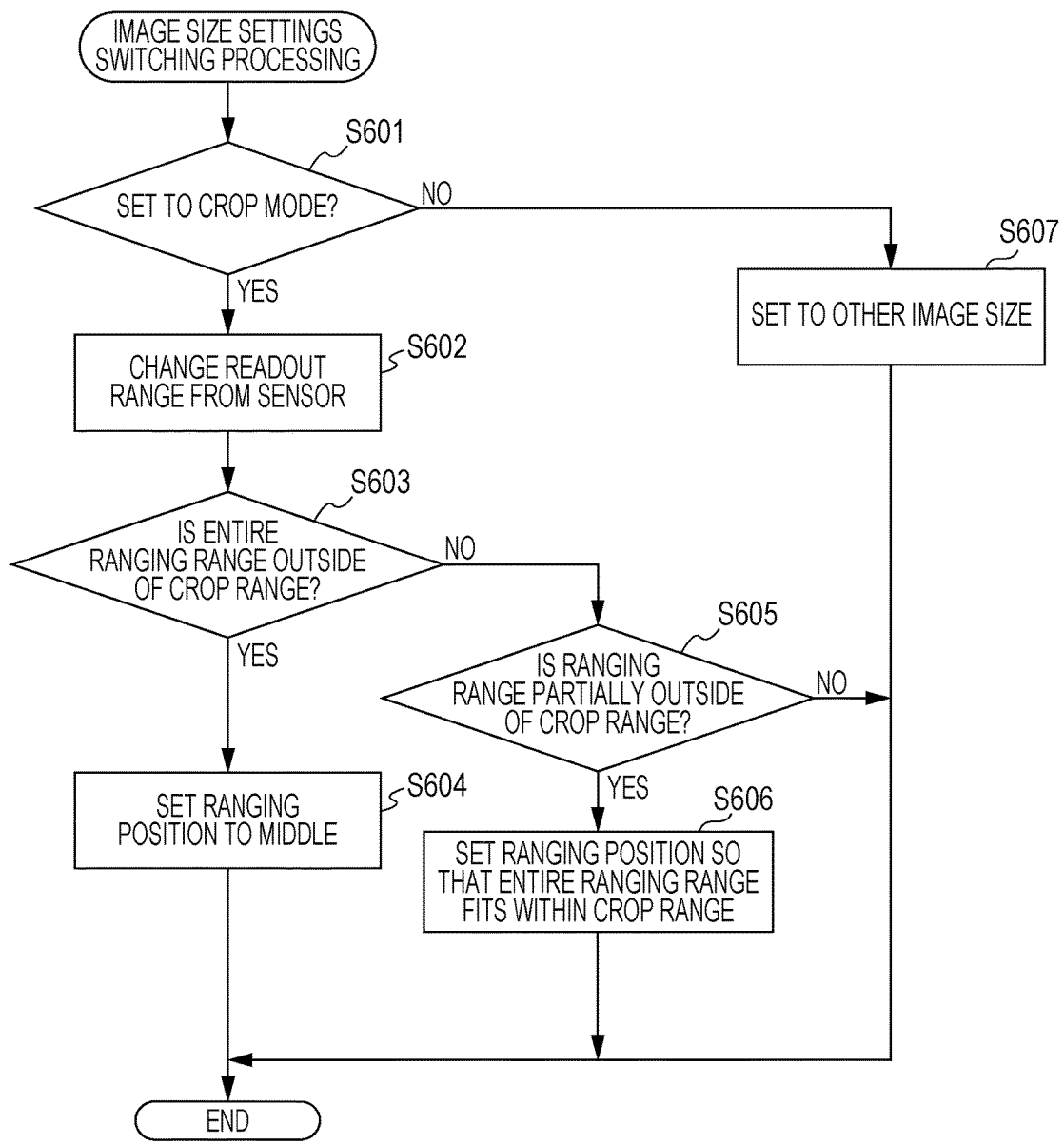

FIG. 14A
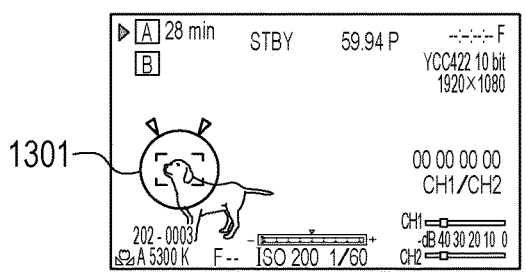
FIG. 14C
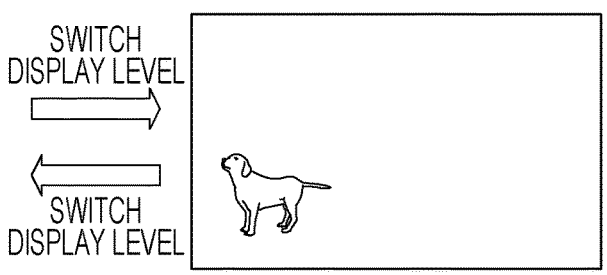
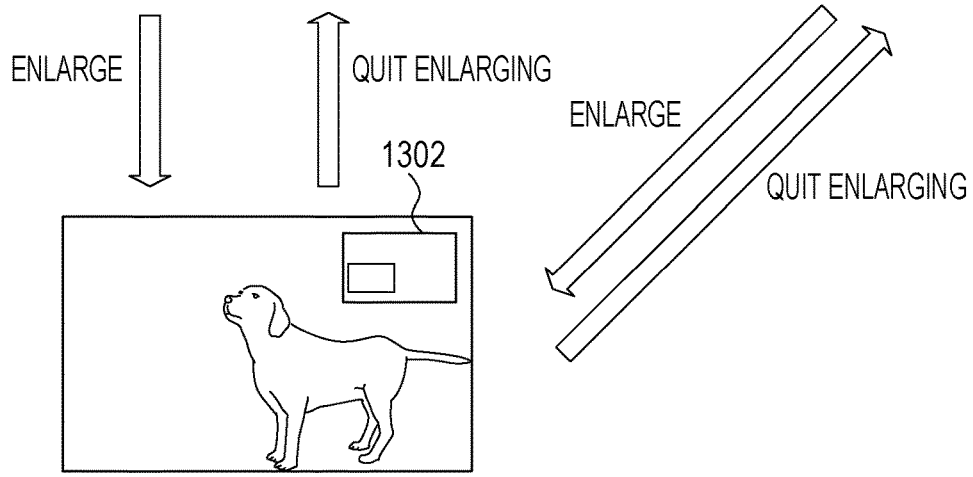
FIG. 14B

DISPLAY CONTROL APPARATUS AND CONTROL METHOD OF THE SAME

BACKGROUND OF THE INVENTION

Field of the Invention

The present invention relates to a display control apparatus and a control method of the same, and particularly relates to display technology of information relating to focus.

Description of the Related Art

There has been proposed a display apparatus that calculates a focus evaluation value of a subject by a ranging sensor and multiple imaging sensors, and displays a front-focus/back-focus state of a subject being imaged and the degree of off-focus, based on the evaluation value.

Japanese Patent Laid-Open No. 2002-365710 proposes displaying focus information regarding whether the focus state of a photographing lens is front focus, back focus, or in-focus, based on the focus state detected by a focus state detecting unit.

Japanese Patent Laid-Open No. 2007-279334 proposes displaying a marker offset by an amount corresponding to the deviation of the focus position from the in-focus portion, in a rotationally symmetric positional relation, when manually focusing.

Japanese Patent Laid-Open No. 2011-039206 proposes being able to perform face auto-focus (AF) where ranging is performed within the range of a detected face. Also proposed is being able to easily change to manual focus (MF) mode when in AF mode by a single operation of a predetermined operating member, and display a dialogue showing the state of focus position adjustment (to which position the focus position has moved), whereby the focus position can be adjusted.

There is known a crop shooting mode where an image is recorded based on signals read out from pixels of a partial region of the imaging sensor, not all effective pixels. Japanese Patent Laid-Open No. 2005-175683 proposes being able to selected one or the other of a crop shooting mode where a cropping function is used, and a normal shooting mode where the cropping function is not used. Also proposed is a digital camera which can simultaneously acquire images of multiple regions within an image that has been imaged, by setting the size and position of multiple crop regions in the crop shooting mode.

There is also known an imaging apparatus that enables a part of a live view image to be displayed in an enlarged manner, so as to be confirmed in detail. Japanese Patent Laid-Open No. 2013-201527 proposes being able to enlarge a live view image to 5 times or 10 times, where changing the position of the AF frame changes the enlarged position in accordance with the position thereof, but changing the enlarged position does not change the position of the AF frame.

The subject to be focused on does not necessarily exist at the middle of the image. Also, shooting moving images may involve the subject to be focused on moving within the image, or focus being changed from one subject to another subject. Accordingly, a target area for a guide display relating to focusing (called "focus-assist") can preferably be set at an optional position within the image, and be movable.

In Japanese Patent Laid-Open No. 2002-365710, the focus information is displayed outside of the image region within the display region. Accordingly, the subject to be focused on and the display position of the focus information are distanced from each other, leading to increased movement of the line of sight when adjusting focus while viewing both, so there has been problems with ease of use. On the other hand, in Japanese Patent Laid-Open No. 2007-279334, a marker of a constant area is displayed superimposed on the image regardless of the degree of off-focus, thereby impairing the visibility of the subject.

There are cases in the AF mode where it is useful to display the degree of focus, depending on the operating state of the AF, but the above-described Japanese Patent Laid-Open Nos. 2011-039206 and 2007-279334 had not sufficiently studied such cases. That is to say, the above-described Japanese Patent Laid-Open Nos. 2011-039206 and 2007-279334 have not enabled a guide display for a suitable degree of in-focus to be made in accordance with the AF operating state when in the AF mode.

In a case where a function for displaying focus information relating to a focus detection region such as in Japanese Patent Laid-Open Nos. 2002-365710 and 2007-279334 is carried out in both the normal shooting mode and the crop shooting mode such as in Japanese Patent Laid-Open No. 2005-175683, the following problem occurs. That is to say, when in the normal shooting mode, if the focus detection region is set on the outside of the region used in the crop shooting mode, and then switched to the crop shooting mode, the focus detecting region will be displayed at a position unrelated to the image shot in the crop shooting mode.

In the information display relating to focus such as in Japanese Patent Laid-Open Nos. 2002-365710 and 2007-279334, displaying information relating to focus in live view at the position of the region where the information relating to the focus was acquired facilitates comprehension of what portion of the live view image the focus information pertains to. Now, when this is applied to a case where the live view image is enlarged, as in Japanese Patent Laid-Open No. 2013-201527, the region where the information relating to focus has been acquired also increases in size in the live view display, so displaying the information relating to focus to match this region results in the information display also being large. Thus, if the display of information relating to focus is enlarged to match the enlargement of the live view image, increasing the enlargement scale of the live view image results in the region where the information relating to focus has been acquired not fitting in the range of the enlarged live view image being displayed. This has been a problem since the information display relating to focus cannot be appropriately displayed.

Also, when performing an enlarged display of part of the live view image as in Japanese Patent Laid-Open No. 2013-201527, what part is desired to be enlarged differs depending on the situation. For example, in a case where information relating to focus is being displayed such as in Japanese Patent Laid-Open Nos. 2002-365710 and 2007-279334, the focus point detection position where the focus information has been acquired might be desirable to be enlarged. However, constantly enlarging the focus point detection position is not necessarily desirable, and there also will be cases where the user wants to enlarge and confirm the state of a subject situated at other than the focus point detection position that has been set. There also are cases where the user does not place importance on the focus point detection position that has been set, and the user does not recognize the relationship between the subject that the user wants to enlarge and confirm and the focus point detection position that has been set.

SUMMARY OF THE INVENTION

The present invention provides a display control apparatus that can perform a guide display of degree of in-focus with reduced obstruction of visibility of the subject, and a control method of the same.

The present invention also provides a display control apparatus that can perform a guide display of degree of in-focus more appropriately in accordance with the operating state of AF, and a control method of the same.

The present invention also provides a display control apparatus that can display focus information at a more appropriate position when switching from an operation mode that is not a crop mode to the crop mode, and a control method of the same.

The present invention also provides a display control apparatus that can more appropriately display information relating to focus in a case of an enlarged live view display, and a control method of the same.

The present invention also provides a display control apparatus that, when displaying an enlarged live view image on a device capable of display information relating to focus, can perform enlarged display of an enlargement region that is more suitable for the user in accordance with the situation, and a control method of the same.

A display control apparatus includes: a display control unit configured to display a live view image being imaged by an imaging unit, and to display a display item indicating a degree of in-focus, superimposed on the live view image; an acquiring unit configured to acquire information relating to a degree of in-focus in a focus detecting region; and a changing unit configured to change display positions and display forms of a first indicator and second indicator that indicate a degree of in-focus by a positional display relationship with each other, and a third indicator that indicates a focus position, based on information acquired by the acquiring unit, the first indicator and the second indicator and the third indicator are included in the display item.

A display control apparatus includes: an autofocus (AF) mode setting unit configured to set a first AF mode that performs continuous AF operations; a display control unit configured to, in a case where the first AF mode has been set and continuous AF is being performed, displays on a live view image a first display item that indicates an AF position that is a position of an object to focus on in AF; an accepting unit configured to, in a case where the first AF mode has been set and continuous AF is being performed, accepts a stop instruction to stop the continuous AF; and a control unit configured to display a second display item indicating a degree of in-focus as to a position corresponding to the AF position, instead of the first display item, in response to the stop instruction having been received by the accepting unit and the continuous AF having been stopped.

A display control apparatus includes: a mode setting unit configured to set a particular operation mode that performs AF operations in accordance with an AF execution instruction from a user; an accepting unit configured to accept the AF execution instruction in a case where the particular operation mode has been set; and a display control unit configured to effect control to, in a state where the particular operation mode has been set, display, on a live view image, a second display item indicating a degree of in-focus at a position corresponding to an AF position that is a position of an object to focus on in AF, before the accepting unit accepts the AF execution instruction, and display a first display item indicating the AF position instead of the second item, in accordance with the accepting unit having accepted the AF execution instruction.

A display control apparatus includes: a mode setting unit configured to set a particular operation mode that performs AF operations in accordance with an AF execution instruction from a user; an accepting unit configured to accept the AF execution instruction in a case where the particular operation mode has been set; and a display control unit configured to effect control to, in a state where the particular operation mode has been set, display, on a live view image, a second display item indicating a degree of in-focus at a position corresponding to an AF position that is a position of an object to focus on in AF without executing AF, before the accepting unit accepts the AF execution instruction, and execute AF based on the AF position in accordance with the accepting unit having accepted the AF execution instruction.

A display control apparatus includes: a setting unit configured to set one of a plurality of operation modes including to a first operation mode in which is performed shooting using a first range of an imaging unit, and a second operation mode in which is performed shooting using a second range that is narrower than the first shooting range of the imaging unit; a display control unit configured to display a live view image that is being imaged by the imaging unit, and also to display a display item relating to focus at a position on the live view image corresponding to a focus detection region; and a control unit configured to effect control to, in a case where the mode is switched to the second operation mode from a state where the first operation mode has been set and the focus detection region is set within the second range, the position of the focus detection region is not changed, and in a case where the mode is switched to the second operation mode from a state where the first operation mode has been set and the focus detection region is set outside of the second range, the position of the focus detection region is changed to inside the second range.

A display control apparatus includes: a display control unit configured to effect control to display a live view image imaged by an imaging unit, and to display a display item relating to focus in a focus detection region, superimposed on the live view image; an enlarging unit configured to perform enlarged display of the live view image by any one of a plurality of scales including a first scale that is larger than a normal scale, and a second scale that is larger than the first scale; and a control unit configured to differ the display form of the display item depending on a case of displaying the live view image at the first scale and a case of displaying the live view image at the second scale.

A display control apparatus includes: an enlarging unit configured to display a live view image imaged by an imaging unit by any one of a plurality of scales including a first scale that is larger than a normal scale, and a second scale that is larger than the first scale; and a control unit configured to effect control to, in a case of displaying the live view image at the first scale by the enlarging unit, display a display item relating to focus in a focus detection region, superimposed on the live view image enlarged at the first scale, and in a case of displaying the live view image at the second scale by the enlarging unit, display the live view image enlarged at the second scale without displaying the display item.

A display control apparatus includes: a display control unit configured to effect control to display a live view image imaged by an imaging unit, and also display a display item relating to focus in a focus detection region, superimposed on the live view image; a setting unit configured to set whether or not to display the display item; an enlarging unit configured to display the live view image by any one of a plurality of scales including a first scale that is larger than a normal scale, and a second scale that is larger than the first scale; and a control unit configured to effect control so that enlargement at the second scale by the enlarging unit can be performed in a case where the setting unit is set to where the display item is not displayed, and so that enlargement at the second scale by the enlarging unit cannot be performed in a case where the setting unit is set to where the display item not displayed.

A display control apparatus comprising: a display control unit configured to effect control to display a display item indicating information of focus regarding a focus detection position, superimposed on a live view image imaged by an imaging unit; a display setting unit configured to set whether or not to display the display item; an enlarging unit configured to effect control to display the live view image more enlarged than a normal scale; and a control unit configured to effect control to, in a case of performing enlarging by the enlarging unit when the display setting unit is set to display the display item, perform enlarged display of an enlargement range based on the focus detection region before enlarging, and in a case of performing enlarging by the enlarging unit when the display setting unit is set to not display the display item and is in a particular operation mode, perform enlarged display of an enlargement range not based on the focus detection region before enlarging.

Further features of the present invention will become apparent from the following description of exemplary embodiments with reference to the attached drawings.

BRIEF DESCRIPTION OF THE DRAWINGS

FIGS. 2A and 2B are explanatory diagrams of a light receiving face of an imaging device.

FIGS. 4A through 4C are a flowchart of screen type deciding processing.

FIG. 6 is a flowchart of image size settings switching processing.

FIGS. 14A through 14C are screen display examples before and after enlargement processing in accordance with Display level.

DESCRIPTION OF THE EMBODIMENTS

Hardware Configuration

Figure 1:
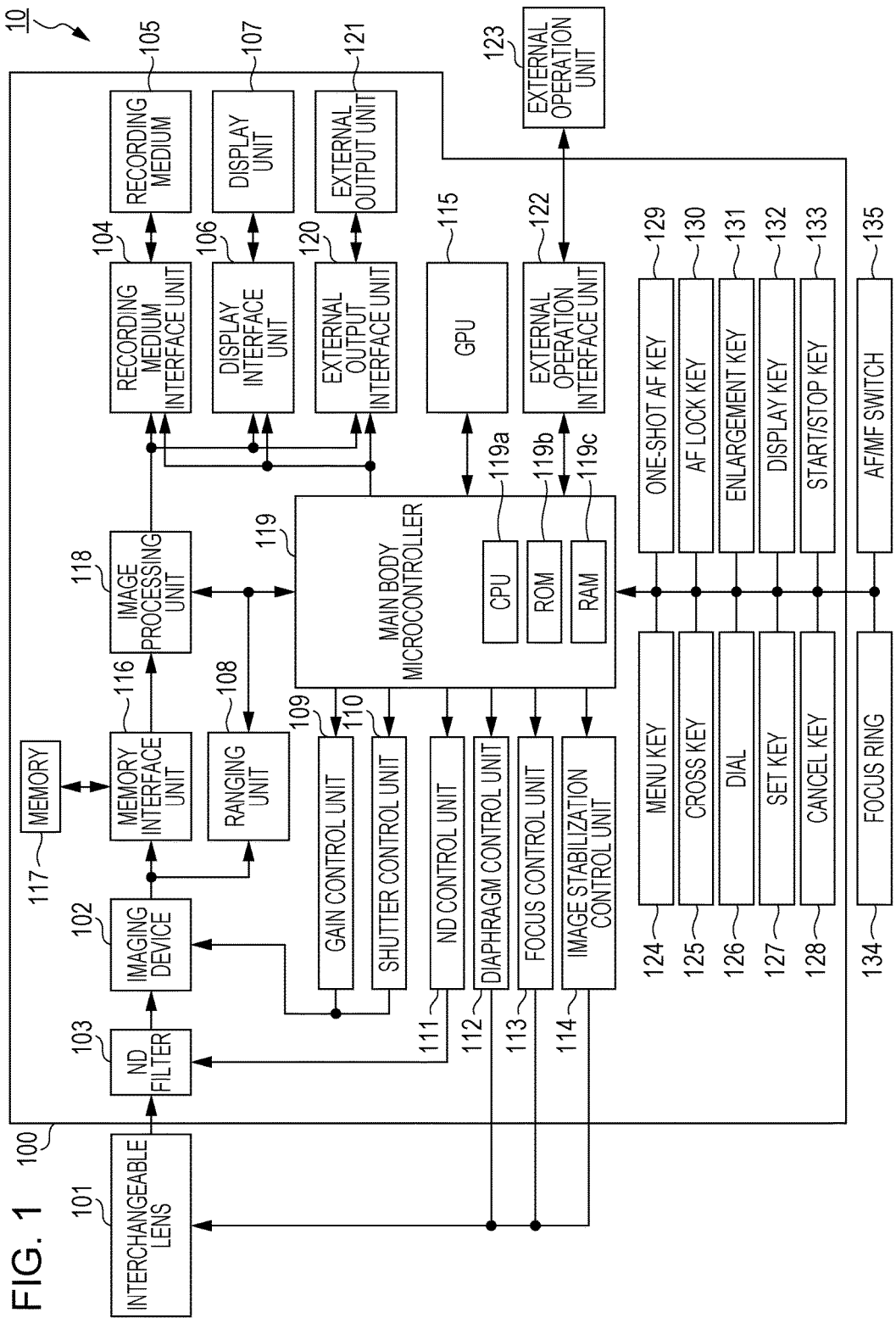
FIG. 1 is a configuration block diagram of a digital camera.

FIG. 1 illustrates an example of the hardware configuration of a digital camera 10 as one example of a display control apparatus according to the present embodiment.

A housing 100 is an outer package, containing may components of the digital camera 10. Various types of operating members, as well as a display unit 107 and an external output unit 121 are exposed on the surface of the housing 100.

An interchangeable lens 101 is a photographing lens made up of multiple lens groups, including a focusing lens, a zoom lens, and a shift lens within, and also includes a diaphragm.

A imaging device 102 has a configuration where multiple pixels having photoelectric conversion elements arrayed two-dimensionally. The imaging device 102 performs photoelectric conversion of an optical image of a subject formed by the interchangeable lens 101, which is further subjected to analog-to-digital conversion by an A/D converting circuit, thereby outputting image signals in increments of pixels (RAW image data). The imaging device 102 used in the present embodiment and details of a related ranging unit 108 will be described later along with FIG. 2.

A neutral density (ND) filter 103 is provided to the digital camera 10 to adjust the quantity of incident light, separately from the diaphragm provided to the lens.

An image processing unit 118 corrects level difference arising from the imaging device 102. In addition to correcting the level of pixels in an effective region using pixels of an optical black (OB) region, defective pixels are corrected using surrounding pixels. Other examples of processing performed include correction of decreased marginal illumination, color correction, edge enhancement, noise reduction, gamma correction, debayering, compression, and so forth. After having performed the above processing on the RAW image input from the imaging device 102, the image processing unit 118 outputs the corrected image data to another control unit.

A recording medium interface unit 104 is an interface between a recording medium 105 and the digital camera 10, controlling recording of image data input from the image processing unit 118 in the recording medium 105, and reading out the recorded image data from the recording medium 105.

The recording medium 105 is a recording medium made of semiconductor memory or the like, to record shot video and image data. Image data is recorded and recorded image data is read out under control of the recording medium interface unit 104. The recording medium 105 is a detachable memory card or the like, but may be an internal recording medium as well.

A graphics processing unit GPU 115 is a rendering engine that draws various types of information displays and menu screens of a video camera in video random access memory (VRAM). In addition to drawing capabilities of character strings and shapes, the GPU 115 has enlarged/reduced drawing functions, rotated drawing functions, and layer compositing functions. The VRAM has an alpha channel representing transparency, so display objects drawn in the VRAM can be displayed on-screen upon captured images and playback images by a display interface unit 106.

The display interface unit 106 performs superimposed compositing and resizing processing on video data (shot images and playback images) from the image processing unit 118 and display objects rendered in the VRAM by the GPU 115, and outputs (displays) to a display unit 107. When in an enlarged display mode, the display interface unit 106 performs superimposed compositing and resizing processing on a partial region of the video data. As a result, a picture that is enlarged more than normal is displayed on the display unit 107 in the enlarged display mode, so the photographer can perform focus adjustment operations in manual focus (MF) more accurately.

The display unit 107 is an external monitor viewable from the side of the housing 100, displaying image data output from the display interface unit 106 for confirmation of field angle, or a display unit within a viewfinder. The display unit 107 may be configured using a liquid crystal display, an organic light-emitting diode (OLED) display, or the like.

A main body microcontroller 119 is a control unit that controls the operations of the entire digital camera 10, and is configured using a microprocessor or the like. The main body microcontroller 119 has a CPU 119a, read-only memory (ROM) 119b, and random access memory (RAM) 119c. The CPU 119a loads a program stored in the ROM 119b to the RAM 119c and executes the program, thereby executing the operations of the later-described flowcharts.

A gain control unit 109, shutter control unit 110, ND control unit 111, and diaphragm control unit 112 described below are each blocks for exposure control. These are controlled by the main body microcontroller 119 based on the results of the main body microcontroller 119 calculating the luminance level of the image data output from the image processing unit 118, or based on operation parameters which the photographer has manually set. The gain control unit 109 controls the gain of the imaging device 102.

The shutter control unit 110 controls the shutter speed of the imaging device 102. The ND control unit 111 controls the quantity of incident light to the imaging device 102 through the ND filter 103. The diaphragm control unit 112 controls the diaphragm of the interchangeable lens 101.

A focus control unit 113 performs different operations depending on whether the focus driving state held in the main body microcontroller 119 is AF or MF. When AF, focus information is calculated at the main body microcontroller 119 referencing the image data output from the image processing unit 118, and based thereupon the focus control unit 113 controls the focus lens within the interchangeable lens 101. Alternatively, the focus control unit 113 controls the focus lens within the interchangeable lens 101 based on a defocus amount output from the ranging unit 108 obtained by imaging plane phase difference detection.

An AF frame may be set in a partial region of the image data, and focus information may be calculated based only on subjects in the AF frame. There are two operation modes beneath the AF mode, depending on the behavior of the main body microcontroller 119. One is a one-shot AF mode, where AF control is performed only when a one-shot AF key 129 is pressed, and after determination of whether focus was successful or failed, control of the focus control unit 113 is stopped. The other is a continuous AF mode (servo AF), where AF control is continuously performed. Note however, even when in the continuous AF mode, the control of the focus control unit 113 is stopped when in an AF locked state by pressing an AF lock key 130. Switching between these two modes is performed by changing settings in the menu screen.

When in the MF mode, AF control by the focus control unit 113 is stopped. In this case, the photographer can perform desired focus control by rotating a focus ring 134 assembled into the interchangeable lens 101.

An image stabilization control unit 114 uses a motion vector of a subject calculated by the main body microcontroller 119 referencing the image data output from the image processing unit 118, to control the shift lens within the interchangeable lens 101 so as to cancel out shaking of the image due to shaking of the hands holding the camera based on the calculated motion vector. Alternatively, the image stabilization control unit 114 performs electronic image stabilization processing, where images in the frames of a moving image are cut out in the direction of cancel out shaking of the image due to shaking of the hands holding the camera.

A memory interface unit 116 writes RAW image data for all pixels output from the imaging device 102 to memory 117, and also reads out RAW data held in the memory 117 and outputs to the image processing unit 118. The memory 117 is a volatile recording medium, storing RAW image data for all pixels of several frames.

The image processing unit 118 performs image processing necessary for control on the RAW image data for all pixels, that has been sent from the memory interface unit 116.

An external output interface unit 120 performs resizing of video data from the image processing unit 118. The external output interface unit 120 also performs signal conversion and imparts control signals suitable for the standard of an external output unit 121, and outputs to the external output unit 121.

The external output unit 121 is a terminal that externally outputs video data, such as a serial digital interface (SDI) terminal or High-Definition Multimedia Interface (HDMI (a registered trademark)) terminal. External devices such as monitor displays and external recording devices can be connected thereby.

An external operation interface unit 122 receives control instructions from an external operation unit 123, and makes notification thereof to the main body microcontroller 119. Examples include an infrared remote-control photoreceptor, a wireless local area network (LAN) interface, and a Local Application Control Bus System (LANC (a registered trademark)).

The external operation unit 123 transmits control signals (control commands) to the external operation interface unit 122. Instructions (commands) corresponding to operations of operating members 124 through 135 included in the housing 100 and interchangeable lens 101 can be transmitted, and further, information to change settings in menu screens displayed on the display unit 107 can be transmitted.

The operating members 124 through 135 are made up of members such as keys (buttons), dials, tactile switches, rings, touch panels, and so forth. All of these serve to accept operations performed by the photographer, and notify the main body microcontroller 119 of control instructions. The operating members 124 through 133 are main-unit-side operating members assembled to the housing 100. The operating members 134 and 135 are lens-side operating members assembled to the interchangeable lens 101. Part of these operating members can have their roles exchanged or be assigned to other functions, by settings made in menu screens.

A menu key 124 gives instructions to display a menu screen on the display unit 107, or in a case where a menu screen is already open, to close the menu screen.

A cross key 125 and dial 126 both give instructions to move a cursor in a menu screen to select an item, or move a frame display relating to focus in a direction desired by the photographer. The cross key 125 is a directional key including an up key, down key, left key, and right key. Each of the four may be separate operating members, or may be configured as a single member that can instruct one of the four directions depending on the position thereof that is pressed. The dial 126 is a rotational operating member by which clockwise operations and counterclockwise operations can be performed.

A set key 127 is used to select an item in a menu screen where the cursor is situated, and to confirm various types of setting operations.

A cancel key 128 is used to perform instructions to return to one hierarchical level previous to the currently-selected hierarchical level of the menu screen, and to discard various types of setting operations.

The one-shot AF key 129 is to give instructions for AF driving by the focus control unit 113 when the AF mode is one-shot AF.

The AF lock key 130 is to give instructions for stopping control by the focus control unit 113 when the AF mode is the continuous AF mod, and to cancel the control-stopped state.

An enlargement key 131 gives instructions to enlarge video displayed on the display unit 107, and to return to the original size.

A display key 132 is to give instructions to change a Display level held in the main body microcontroller 119. Display of various types of information on the display unit 107 is restricted based on the selected Display level, so that more detailed information can be displayed, or video can be displayed more clearly.

A start/stop key 133 is to give instructions to start and stop recording by the recording medium interface unit 104.

A focus ring 134 is used when the focus driving state is MF, to move the focus lens within the interchangeable lens 101, so that focus adjustment can be performed.

An AF/MF switch 135 is used to switch the focus driving state, between AF and MF.

Imaging Plane Phase Difference Detection

FIGS. 2A and 2B illustrate a part of the light-receiving face of the imaging device 102 serving as an image sensor. The imaging device 102 has an array of pixel portions having two photodiodes, that are photoreceptors serving as photoelectric converters, for each microlens, to realize imaging plane phase difference AF. The pixel portions thus can receive light beams from a divided exit pupil of the interchangeable lens 101.

FIG. 2A is a schematic diagram of a part of the surface of an exemplary Bayer array image sensor, having red (R), blue (B), and green (Gb, Gr), for the sake of reference. FIG. 2B illustrates exemplary pixel portions having two photodiodes as photoelectric converters for every microlens, in correspondence with the color filter array illustrated in FIG. 2A.

An image sensor with this sort of configuration is capable of outputting two signals (hereinafter also referred to as "A image signal" and "B image signal") from each pixel portion, for phase difference detection. Signals for recording an image obtained by adding the signals of the two photodiodes (A signal+B signal) also can be output. In a case of this added signal, a signal the same as the output of the image sensor having the exemplary Bayer array generally described in FIG. 2A is output.

Output signals from the imaging device 102 serving as this sort of image sensor are used by the ranging unit 108 to perform correlation computation of the two signals, thereby calculating information such as defocusing amount, various types of reliability, and so forth. The defocusing amount at the image plane is calculated based on the difference between the A signal and B signal. The defocusing amount has a positive/negative value, so whether the focus state is front focus or back focus can be found according to whether the value of the defocussing amount is positive or negative. The absolute value of the defocussing amount gives how far away from in-focus, and if the defocussing amount is 0, the focus state is in-focus. That is to say, the ranging unit 108 outputs information regarding whether front focus or back focus for the defocussing amount calculated regarding the ranging position (ranging region, focal point detection position, focal point detection region) to the CPU 119a and so forth. The ranging unit 108 also outputs focus degree information that indicates the degree of focus (the degree of difference in focus), based on the absolute value of the defocussing amount, to the CPU 119a and so forth. The information of whether front focus or back focus is output in a case where the defocussing amount exceeds a predetermined value, and in a case where the absolute value of the defocussing amount is within a predetermined value, outputs information to the effect of being in-focus. The focus degree information is output as a value where the defocussing amount has been converted into an operation amount for rotating the focus ring 134 until in focus.

Note that in the present embodiment, a signal for imaging, and two signals for phase difference detection, making up a total of three signals, are output from the imaging device 102. However, this method is not restrictive. For example, the imaging signal, and one of the two imaging signals for phase difference AF, making up a total of two signals, may be output. In this case, the other one signal of the two phase difference detection image signals may be calculated using the two output signals from the imaging device 102.

FIG. 2B illustrates an example of an array of pixel portions having two photodiodes, that are photoreceptors serving as photoelectric converters, for each microlens. However, an arrangement may be made arraying pixel portions having three or more photodiodes serving as photoelectric converters, for each microlens. An arrangement also may be made where aperture positions of photoreceptors have multiple different pixel portions are to the microlens. That is to say, it is sufficient as long as two signals for phase difference detection, such as the A signal and B signal that enable phase difference detection, can be obtained as a result.

FIGS. 3A through 6 are flowcharts illustrating control that the digital camera 10 carries out. The operations in these flowcharts are executed by the main body microcontroller 119 (more particularly, the CPU 119a) controls the components of the digital camera 10 in accordance with programs stored in the ROM 119b.

Shooting Mode Processing

Figure 3A:
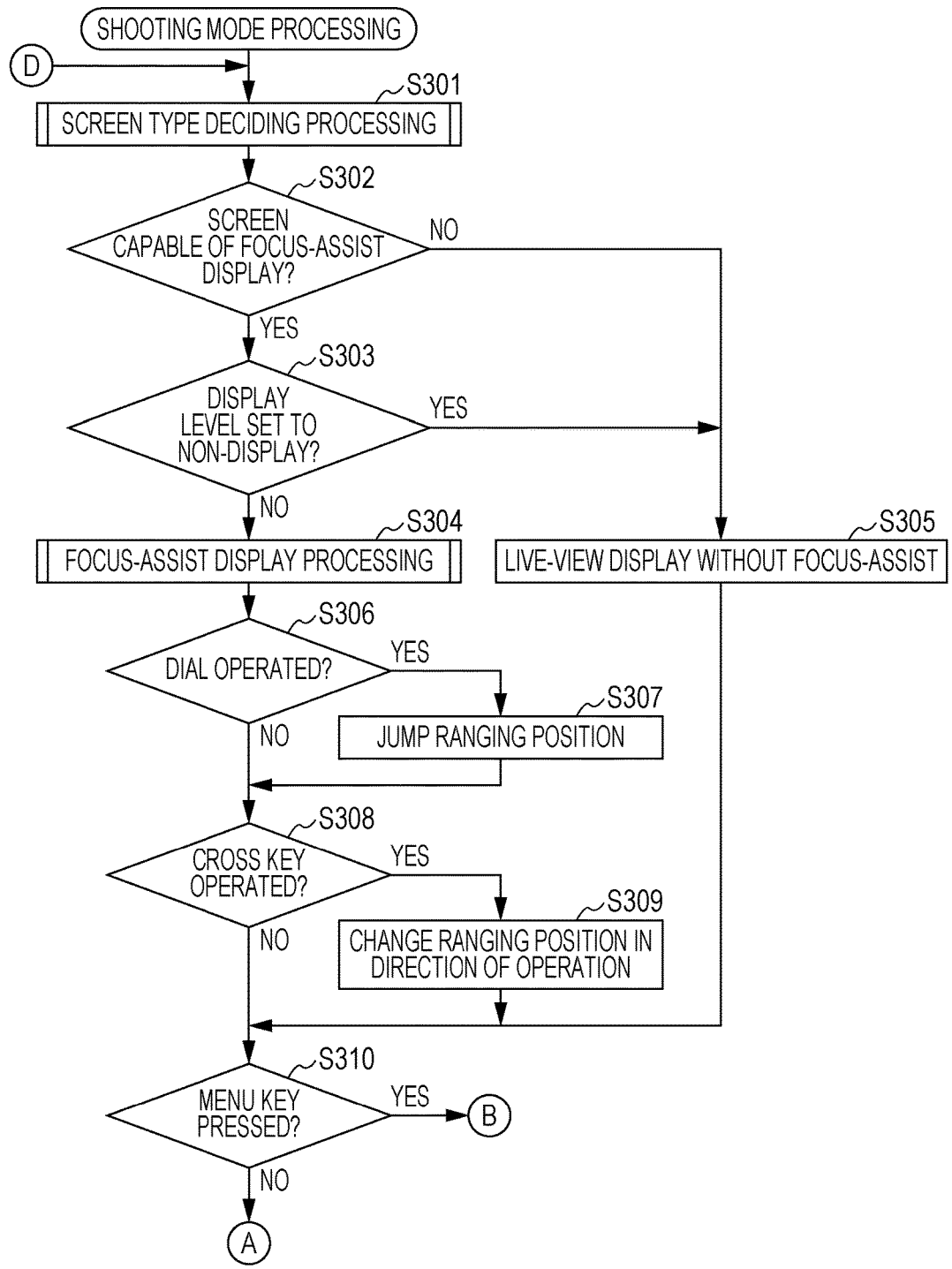
FIGS. 3A through 3D are a flowchart of shooting mode processing.

FIGS. 3A through 3D are flowcharts illustrating the overall operation when the digital camera 10 is in the shooting mode. Upon starting up the digital camera 10 and setting to the shooting, the processing of FIG. 3A is started.

In S301, the CPU 119a decides the type of screen to be displayed on the display unit 107. In this processing, whether or not to display an AF frame, face frame, and focus-assist frame, and the display format thereof, are decided based on information such as whether a face detection function is on or off, whether the focus is set to AF or MF, whether or not in focus as a result of the AF, whether focus-assist is set to on or off, and so forth. This processing will be described later in detail with reference to FIGS. 4A through 4C.

In S302, the CPU 119a determines whether or not the screen type decided in S301 is a screen in a state where a focus-assist display can be made. More specifically, determination is made regarding whether or not "FOCUS-ASSIST: YES" is true in FIGS. 4A through 4C, as a result of the processing thereof which will be described later. If a state where a focus-assist display can be made, the flow advances to S303; otherwise, to S305.

In S303, the CPU 119a determines whether or not information of Display level is in a non-display state. The Display level refers to multiple stages of information display levels regarding various types of information displays displayed superimposed on shot images, regarding what types of information will be displayed to what extent in detail. In a case where the Display level is set to a non-display state, none of the information is displayed on the shot image. Setting the Display level will be described later in S336. In a case where the Display level is set to a non-display state the flow advances to S305; otherwise, to S304.

In S304, the CPU 119a performs focus-assist display processing. This is processing to display a focus-assist, which is a display item to display the degree of in-focus and the operation direction toward in-focus for a subject at a particular position in the shot image (ranging position, focal point detection position), based on the information acquired from the ranging unit 108. This processing will be described later in detail with reference to FIG. 5.

In S305, the CPU 119a displays a live view image on the display unit 107 without performing a focus-assist display. A live view image is a shot image that has been imaged by the imaging device 102 and subjected to image processing by the image processing unit 118 for use as a live view image. A live view image is successively updated at a predetermined frame rate.

In S306, the CPU 119a determines whether or not the dial 126 has been operated (to accept moving instructions). In a case where the dial 126 has been operated, the flow advances to S307; otherwise, to S308.

In S307, the ranging position (ranging region, focal point detection position, focal point detection region) is jumped (moved to any one of multiple particular places) based on the operation of the dial 126. For example, if the picture has been divided vertically and horizontally according to the golden ratio (approximately 5:8), there are four intersections, and the jump (changing ranging position) is performed from the intersection closest to the ranging position immediately before to the position of the intersection in the direction in which the dial 126 has been rotated. The ranging position held in the RAM 119c is updated to the ranging position to which movement has been performed. When the ranging position changes, the focus-assist display position also moves associated with the ranging position. Generally, it is said that a composition is stable where a primary subject is situated at an intersection of the golden ratio in the picture. Accordingly, in a case where shooting is being performed giving consideration to the golden ratio, there is a good chance that user will have the subject that is the object of focus control situated at one of these four intersections. Thus, sequentially jumping the ranging position from one intersection of the golden ratio to another in accordance with operations of the dial 126 enables the ranging position to be quickly changed to the position of the subject regarding which focus adjustment is desired, that is situated at an intersection of the golden ratio. Note that an arrangement may be made where the processing in S306 and S307 is only performed in an operating mode where grid lines for the golden ratio are being displayed, and jumping ranging positions by operating the dial 126 is not performed otherwise, since the user may not be giving consideration to the golden ratio. This also is not restricted to the golden ratio, and jumping may be performed to intersections of lines dividing the picture into three vertically and horizontally, and to the middle or the like. Further, jumping may be performed to different depending on the type of gridlines being displayed. For example, when grid lines for the golden ratio are being displayed, the ranging position is sequentially moved among the intersections of the golden ratio in accordance with the operations of the dial 126 as described above. On the other hand, when grid lines dividing the picture into three vertically and horizontally are being displayed, the ranging position is sequentially moved among the intersections of the lines dividing the picture into three vertically and horizontally, in accordance with the operations of the dial 126 as described above.

In S308, The CPU 119a determines whether or not the cross key 125 has been operated (to accept moving instructions). In a case where the cross key 125 has been operated, the flow advances to S309; otherwise to S310.

In S309, the CPU 119a moves the ranging position by a predetermined amount in a direction corresponding to the key of the cross key 125 that has been operated (one of the directions of up, down, right, and left). The ranging position held in the RAM 119c is updated to the ranging position to which movement has been made. When the ranging position moves, the position of the focus-assist also moves in an associated manner. An arrangement may be made where the movement speed of the ranging position is accelerated when the cross key 125 continues to be operated (pressed for a predetermined amount of time or longer), in accordance with the duration of pressing. Thus, the ranging position can be quickly moved to a subject at a position not close to the ranging position before moving. While the moving of the ranging position in accordance with the operation of the dial 126 is jumping among multiple predetermined positions, the moving of the ranging position in accordance with the operation of the cross key 125 is moving over the user screen to a desired position. An arrangement may be made where, of the image processing unit 118 has performed face detection control, the ranging position is moved to a position of a detected face existing in the direction in which the cross key 125 has been operated. This enables the ranging position to be immediately brought to a face that is not close.

Note that being able to move the ranging position in accordance with user operations such as described in S306 through S309 is only in a case where the later-described face detection function is off in S314. In a case where the face detection function is on, the ranging position moves in association with the position of a face that, out of the detected faces, has been determined to be the main face. Accordingly, in a case where the face detection function is on, the ranging position does not change even if the dial 126 or cross key 125 is operated.

In S310, the CPU 119a determines whether or not the menu key 124 has been pressed. In a case where the menu key 124 has been pressed, the flow advances to S311 in FIG. 3B; otherwise to S324 in FIG. 3C.

In S311, the CPU 119a displays on the display unit 107 a menu screen that is a list of setting items (menu items) relating to the digital camera 10. In the menu screen, one of the menu items is selected using the cross key 125 or dial 126, and selecting and okaying operations are performed using the set key 127, which allows the settings for the various functions of the digital camera 10 to be changed.

In S312, the CPU 119a determines whether or not a menu item that switches the focus-assist function on and off has been selected, and a switching operation to switch the focus-assist function on or off has been performed from that item. In a case where a switching operation to switch the focus-assist function on or off has been performed, the flow advances to S313; otherwise to S314.

In S313, the CPU 119a changes the focus-assist function on/off settings (display settings for assist display). In a case of setting the focus-assist function to on, information indicating being set to on is recorded in the ROM 119b. In a case of setting the focus-assist function to off, information indicating being set to off is recorded in the ROM 119b. In a case of setting the focus-assist function to off from the menu settings items, focus-assist display is not performed in any instance. On the other hand, even in a case of setting the focus-assist function to on from the menu settings items, focus-assist display is not performed at all times; rather, focus-assist display is performed depending on the situation, based on conditions such as whether set to AF or MF, and various conditions such as Display level and so forth.

In S314, the CPU 119a determines whether or not a menu item that switches the face detection function on and off has been selected, and a switching operation to switch the face detection function on or off has been performed from that item. In a case where a switching operation to switch the face detection function on or off has been performed, the flow advances to S315; otherwise to S316.

In S315, the CPU 119a changes the face detection function on/off settings, and records information indicating being set to on in the ROM 119b. In a case where the face detection function is on, a region of a face of a person (particular subject) in the live view image (shot image) being shot. A face frame is given to the region of the face that has been detected, and displayed. In a case where AF is set, AF is performed on a face that is determined to be a primary face (main face) out of multiple faces that have been detected, based on conditions such as being large in size, near to the middle of the screen, being a particular individual that has been registered, or the like (i.e., face AF is performed). When the face detection function has been set to on and face has been detected, the ranging position is overwritten by the position of the main face. That is to say, the position for performing later-described focus-assist is associated with the position of the detected main face.

In S316, the CPU 119a determines whether or not a menu item that changes AF mode settings has been selected, and a changing operation of the AF mode has been performed. There are two AF modes in the present embodiment, one-shot AF and continuous AF. One-shot AF mode is an operation mode where AF is performed once in accordance with the user having pressed the one-shot AF key 129 once, and otherwise the focus position is not moved. AF is performed each time the one-shot AF key 129 is pressed. On the other hand, continuous AF is an operation mode where AF continues to be performed so as to be in focus as to a predetermined subject. Even if the user does not perform any operations, the focus position is continuously adjusted if the subject to be in focus moves or the digital camera 10 moves. Although these two types are exemplified in the present embodiment as AF modes, this is not restrictive, and other AF modes may be selectable. In a case where an AF mode changing operation has been performed, the flow advances to S317; otherwise to S318.

In S317, the CPU 119a sets to the AF mode selected by the user (one or the other of one-shot AF and continuous AF in the present embodiment) in accordance with operations to change the AF mode. Information indicating the set AF mode is recorded in the ROM 119b.

In S318, the CPU 119a determines whether or not a menu item that sets the image size has been selected, and a changing operation to set the image size has been performed. In a case where image size settings have been changed, the flow advances to S319; otherwise to S320.

In S319, the CPU 119a changes the image size settings in accordance with the user operations. Information indicating the setting values of the changed image size settings is recorded in the ROM 119b. In a case where shooting and recording has been performed, the data is recorded in the image size set here. Details of this processing will be described later with reference to FIG. 6.

In S320, the CPU 119a determines whether or not a settings changing operation has been made in the menu screen regarding a settings item other than the settings items described in S312 through S319 above. In a case where a settings changing operation has been made, the flow advances to S321; otherwise to S322. In S321, the CPU 119a changes the settings in accordance with the operations performed in S320.

In S322, the CPU 119a determines whether or not an operation to close the menu screen has been performed. An operation to close the menu screen is an operation of one or the other of pressing the menu key 124 and pressing the set key 127 in a state where the menu end item has been selected. In a case where an operation to close the menu screen has been performed the flow advances to S323; otherwise, the flow returns to S312 and repeats the process.

Figure 3B:
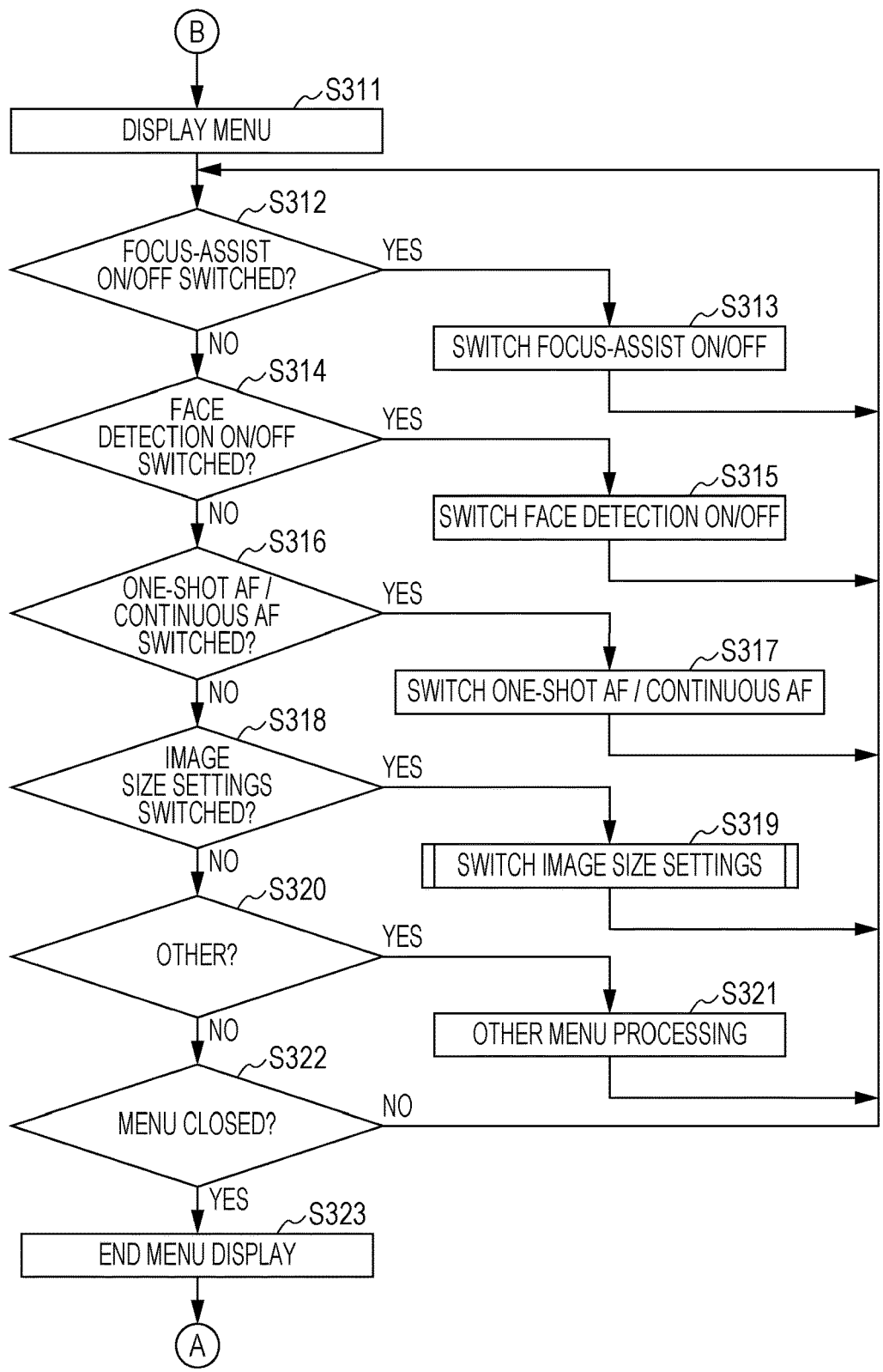
Figure 3C:
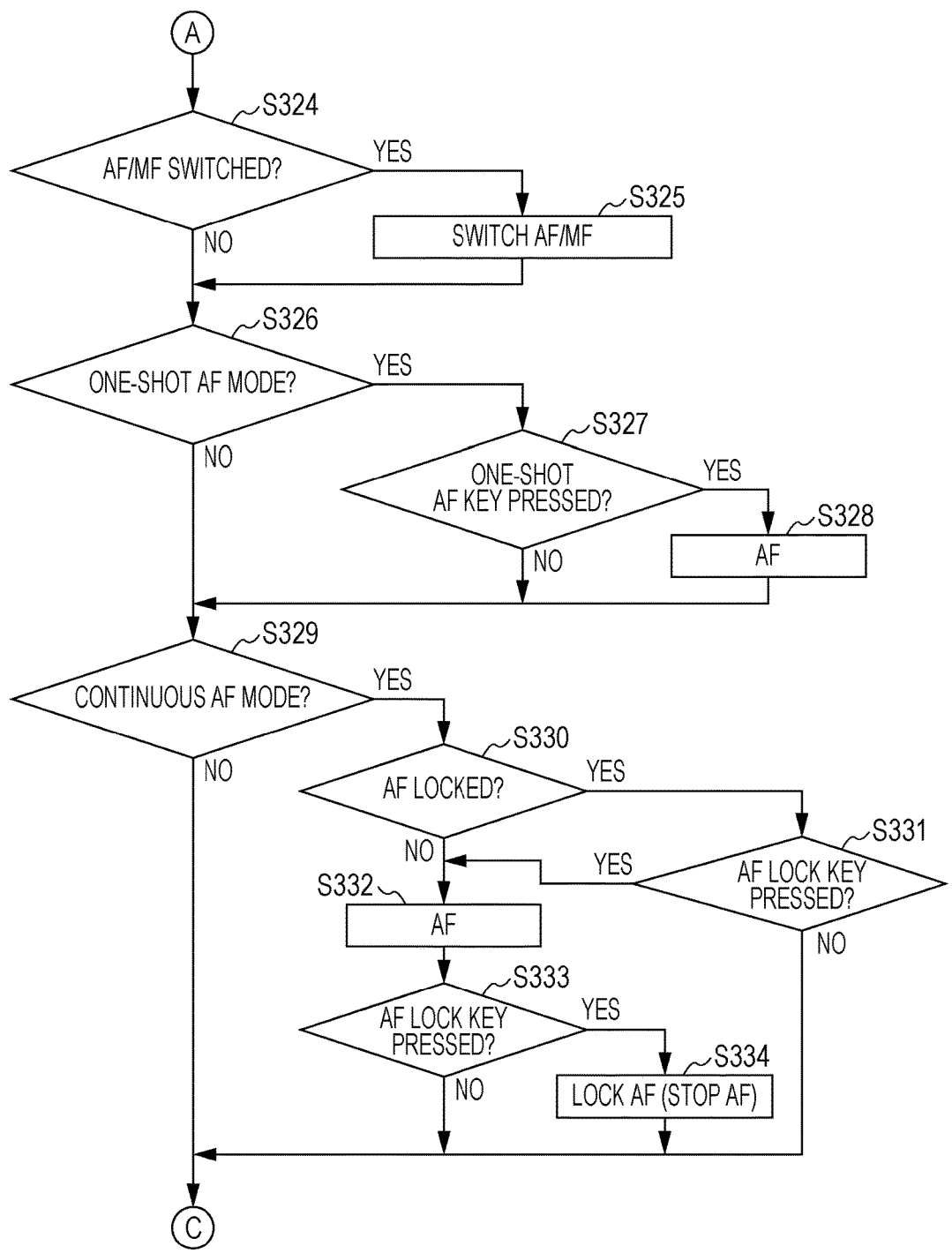
Figure 3D:
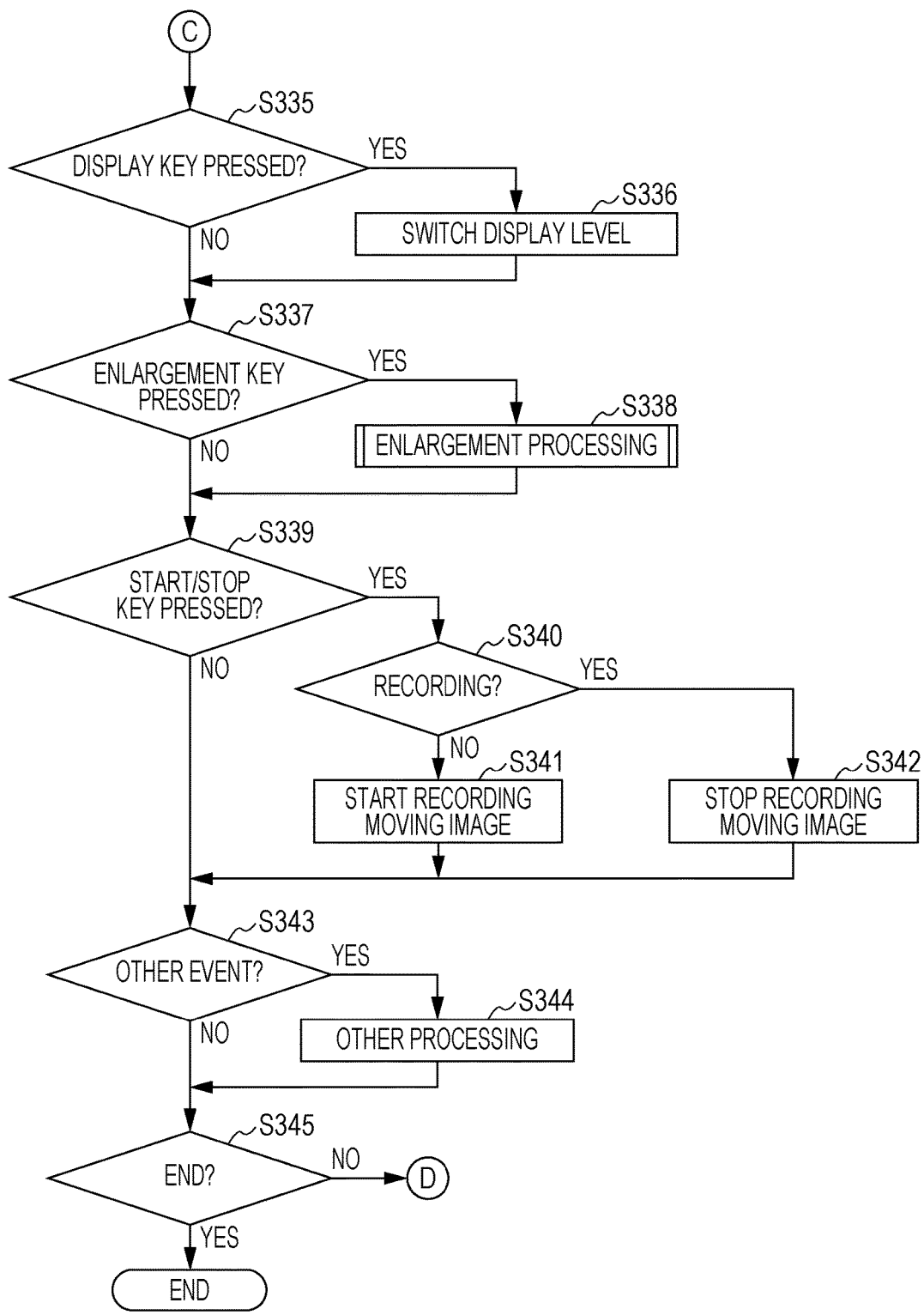

In S323, the CPU 119a ends the menu screen display, displays the live view screen again, and advances to S324 in FIG. 3C.

In S324 in FIG. 3C, the CPU 119a determines whether or not a switching operation between AF and MF has been performed by the AF/MF switch 135. In a case where AF and MF have been switched, the flow advances to S325; otherwise, to S326.

In S325, the CPU 119a switches between AF and MF in accordance with the operation of the AF/MF switch 135. In a case of having been switched to AF, information to the effect of having been switched to AF is recorded in the ROM 119b, and operations are started under AF settings. In a case of having been switched to AF, operations indicated by whichever of the one-shot AF mode and continuous AF mode is set as the current AF mode are performed.

In S326, the CPU 119a determines whether or not the AF/MF switch 135 is set to AF, and the AF mode is the one-shot AF mode. If this is true the flow advances to S327; otherwise to S329.

In S327, the CPU 119a determines whether or not the one-shot AF key 129 has been pressed (to accept AF execution instructions). If the one-shot AF key 129 has been pressed the flow advances to S328; otherwise to S329.

In S328, the CPU 119a controls the focus control unit 113 to perform AF, so that a subject at the ranging position corresponding to the AF frame is in focus.

In S329, the CPU 119a determines whether or not the AF/MF switch 135 is set to AF, and the AF mode is the continuous AF mode. If this is true the flow advances to S330; otherwise to S335 in FIG. 3D.

In S330, the CPU 119a determines whether or not pressing of the AF lock key 130 has caused an AF lock state. If in an AF lock state the flow advances to S331; otherwise to S332. An AF lock state is when AF is temporarily not performed and the focus position is fixed in an operation mode where continuous AF is performed.

In S331, the CPU 119a determines whether or not the AF lock key 130 has been pressed (to accept stop instruction or cancellation instructions). In a case where the AF lock key 130 has been pressed, the flow advances to S332; otherwise to S335.

In S332, the CPU 119a cancels the AF lock state and performs continuous AF, and continuously controls the focus control unit 113 so that the subject corresponding to the AF frame is in focus.

In S333, the CPU 119a determines whether or not the AF lock key 130 has been pressed. In a case where the AF lock key 130 has been pressed, the flow advances to S334; otherwise to S335.

In S334, the CPU 119a stops the continuous AF and locks the AF (effects an AF-lock state). That is to say, AF control by the focus control unit 113 is stopped. Accordingly, changing of the focus position by AF is stopped, by manual focus can be made using the focus ring 134.

In S335, the CPU 119a determines whether or not the display key 132 has been pressed. In a case where the display key 132 has been pressed, the flow advances to S336; otherwise to S337.

In S336, the CPU 119a switches the Display level in accordance with the display key 132 having been pressed. The changed Display level is recorded in the ROM 119b, and information display is performed in accordance with the change Display level.

In S337, the CPU 119a determines whether or not the enlargement key 131 has been pressed. In a case where the enlargement key 131 has been pressed, the flow advances to S338; otherwise to S339.

In S338, the CPU 119a performs enlargement processing. Details of this processing will be described later with reference to FIGS. 7A and 7B.

In S339, the CPU 119a determines whether or not the start/stop key 133 has been pressed. In a case where the start/stop key 133 has been pressed the flow advances to S340; otherwise to S343.

In S340, the CPU 119a determines whether or not a recording operation of a moving image is currently being performed (i.e., whether shooting and recording is performed). If shooting and recordings being performed, the flow advances to S342; otherwise (if in a shooting standby state) to S341.

In S341, the CPU 119a starts recording a moving image. That is to way, a recording image imaged by the imaging device 102 is subjected to processing for recording at the image processing unit 118, and is recorded in the recording medium 105 as a moving image file, according to a predetermined file format.

In S342, the CPU 119a stops recording the moving image. Upon having stopped recording the moving image, moving image ending processing such as giving attributes to the moving image file that had been recorded, closing the file, and so forth.

In S343, the CPU 119a determines whether or not an event has occurred other than an event listed in the steps described above. In a case where there has been another event, the flow advances to S344; otherwise, to S345. In S344, the CPU 119a performs processing corresponding to the event that has occurred in S343.

In S345, the CPU 119a determines whether or not there has been an event to end the shooting mode processing. In a case where there has been a termination event, the shooting mode is ended; otherwise, the flow returns to S301 and repeats the processing. Examples of termination events include an operation of turning the power of the digital camera 10 off, the power going off due to low power source voltage, auto power off due to no operations having been performed in shooting standby state for a predetermined amount of time, transitioning to an operation mode other than the shooting mode, such as playback mode or communication mode.

Although description has been made that the ranging position can be moved in accordance with user operations only in a case where the face detection function set in S314 is off, an arrangement may be made where the ranging position can be moved in accordance with user operations even in a case where the face detection function is set to on. In this case, the ranging position is associated with the position of the main face that has been detected until the user operations described in S306 through S309 are performed to move the ranging position. In a case where a user operation is performed to move the ranging position, the ranging position is moved according to user operations, unassociated with the position of the main face. After the ranging position has moved in accordance with user operations, the ranging position is not associated with the position of the main face. Thereafter, if a return operation (reset operation) is performed to return to the state where the ranging position is associated with the main face, the ranging position is at the position of the main face again, and thereafter the ranging position is associated with the position of the main face. A conceivable reset operation is to press the cancel key 128, or the like. In this case, if the focus-assist function has been set to on in the later-described S321 and focus-assist is displayed, a face frame indicating the main face is not displayed when the ranging position is associated with the position of the main face. In a case where a user operation is performed to move the ranging position, the ranging position is moved in accordance with the user operation unassociated with the position of the main face, and the focus-assist position also moves accordingly. A face frame indicating the position of the main face is newly displayed in conjunction with this. The face frame indicating the main face is hidden when a return operation is subsequently performed to reassociate the ranging position and the position of the main face.

Screen Type Deciding Processing

The screen type deciding processing described in S301 in FIG. 3A will be described. First, the screen types will be described. FIGS. 11A through 11G illustrate display examples of various types of display states (various screen types) on the display unit 107. Note that, unless the Display level is set to non-display, information other than focus-assist, AF frame (AF region), and face frame, is displayed superimposed on the live view image in accordance with the Display level, although this is omitted from FIGS. 11A through 11G. Information other than the face frame in accordance with the Display level includes grid lines, remaining battery level, remaining shooting time, and so forth. Note that a case where the face detection function described in S314 and S315 is set to on will be simply referred to as face detection on, and a case where the face detection function is set to off will be simply referred to as face detection off.

Figure 11A:
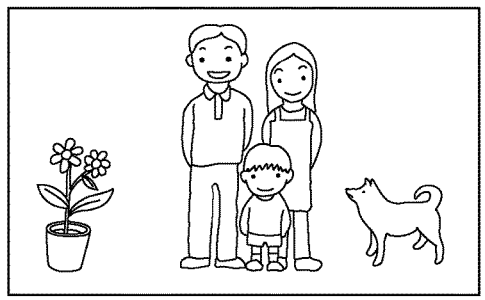
FIGS. 11A through 11G are screen display examples after deciding screen type.

FIG. 11A is a display example of a case where face detection is off and the focus-assist function is set to off, and a case where face detection is off and the functions of AF, one-shot AF mode, and focus-assist are set to off. A live view image is displayed on the display unit 107 here, and the focus-assist, AF frame, and face frame are not displayed.

Figure 11B:
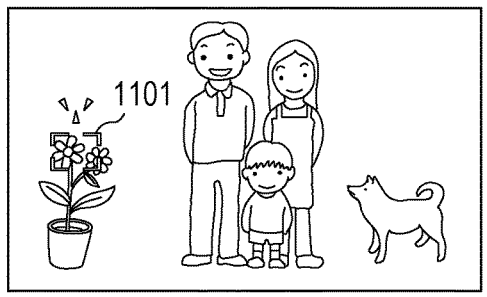

FIG. 11B is a display condition in a case where, in addition to the condition of face detection being off and the focus-assist function being set to on, one of the following is true: the focus mode is MF, the focus mode is in one-shot AF mode and AF operation has not been performed yet, and the focus mode is continuous AF mode and in the AF lock state. A focus-assist 1101 is displayed on the display unit 107 superimposed on the live view image. The focus-assist 1101 is an item indicating the subject at the position (ranging position, focus detecting position) where the focus-assist 1101 is displayed is in focus, front focus or back focus, and degree of in-focus (degree of off-focus). The user can adjust the focus in MF referencing the focus-assist 1101. Details of the focus-assist 1101 will be described later with reference to FIG. 8.

Figure 11C:
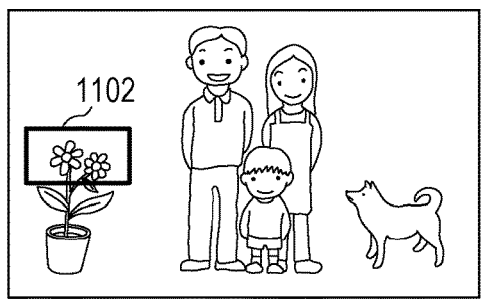

FIG. 11C is a display example of the display unit 107 either during performing AF operation in the one-shot AF mode or continuous AF mode with face detection off, or after having performed AF operation in the one-shot AF mode with face detection off. An AF frame 1102 is displayed to indicate a subject region (ranging position, AF position, focus detection position) that is the object of AF control (AF operation), and the AF control state. The position of the AF frame 1102 indicates the subject region (ranging position, AF position) that is the object of AF control. The color of the AF frame 1102 indicates the state of the AF operation. The AF frame 1102 is displayed in white when performing continuous AF (a state of continuous AF operation) and from the start of one-shot AF till in-focus. When in-focus has been achieved by one-shot AF, the AF frame 1102 is displayed in green.

Figure 11D:
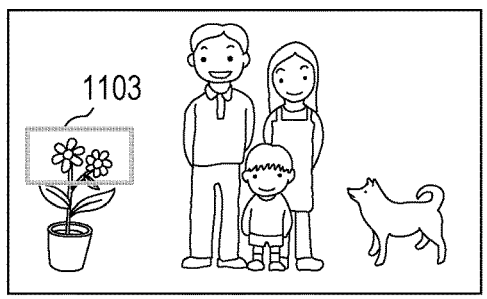

FIG. 11D is a display example where the focus-assist function is set to off in a case where the AF/MF settings are set to AF, and an AF lock state has occurred in the continuous AF mode. An AF frame 1103 is displayed in gray, superimposed on the live view image, indicating that AF operations are not being performed.

Figure 11E:
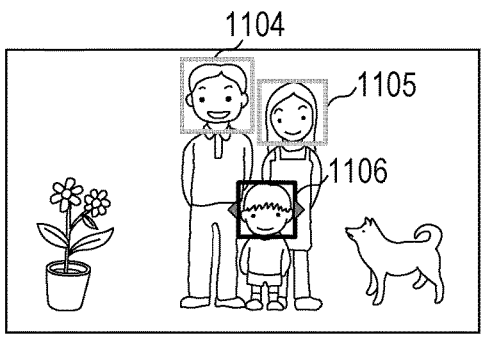

FIG. 11E is a display example of a case where AF operations are being performed in the one-shot AF mode or continuous AF mode, or after AF operations having been performed, with face detection on. Face frames 1104, 1105, and 1106 are displayed superimposed on the live view image. The face frames 1104 through 1106 are displayed at positions where faces have been detected in the shot image. The face frame 1106 is a frame indicating a face that is to be the object of face AF (main face) out of the detected faces, and the face frames 1104 and 1105 are frames indicating faces other than the main face (sub-faces). The display form is different for the main-face face frame 1106 and the sub-face face frames 1104 and 1105, so that the user can identify that the face frame 1106 is a face frame indicating the main face. This differentiation is made by, for example, color, whether single line or double line, etc. In the example in FIG. 11E, triangles on the sides of the frame indicate that this is a main face frame. The triangles on the sides of the frame also indicate that the main face can be changed to another face by pressing the right or left key (i.e., in accordance with user operations). This means that in the present embodiment, the user can specify which of the multiple detected faces is to be the main face for face AF (a region to serve as the AF region can be selected from multiple particular subject regions that have been detected). In order to represent the operation status of AF, the sub-face face frames 1104 and 1105 are displayed in gray since they are not the object of AF. The face frame 1106 indicating the main face is displayed in white while performing AF in one-shot AF or continuous AF, and in green when in-focus is achieved in face AF by one-shot AF.

Figure 11F:
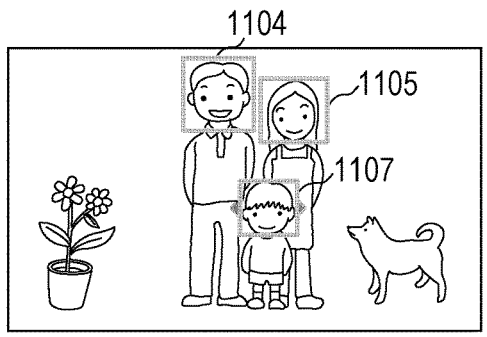

FIG. 11F is a display condition in a case where, in addition to the condition of face detection being on and the focus-assist function being set to off, one of the following is true: the focus mode is set to MF, the focus mode is the one-shot AF mode and in a state before performing AF, and the focus mode is the continuous AF mode in the AF lock state. Face frames 1104 and 1105 are face frames representing sub-faces, and a face frame 1107 is a face frame representing the main face. Note however, that AF operations are not performed with regard to the face frame 1107. In this case, both the face frame 1107 representing the main face and the face frames 1104 and 1105 representing sub-faces are displayed in gray, since AF operations are not performed. Still, the display form of the face frame 1107 is such that it can be distinguished as being the main face (indicated as being the main-face face frame by the triangles to the sides of the face frame 1107).

Figure 11G:
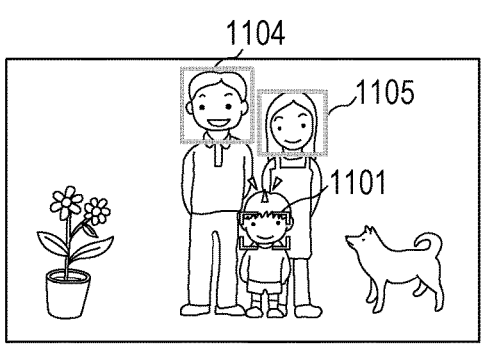

FIG. 11G is a display condition in a case where, in addition to the condition of face detection being on and the focus-assist function being on, one of the following is true: the focus mode is set to MF, the focus mode is the one-shot AF mode and in a state before performing AF, and the focus mode is the continuous AF mode in the AF lock state. In this case, the focus-assist 1101 is displayed at the position of the main face, not the face frame such as illustrated in FIGS. 11E and 11F. The sub-face face frames 1104 and 1105 are displayed in gray, and the focus-assist 1101 is displayed in white, to represent the state of AF operations. That is to say, the ranging position which is the position of the focus-assist 1101 is associated with the position of the detected main face. The display position of the focus-assist 1101 on the live view image also is associated with the position of the main face.

Figure 4A:
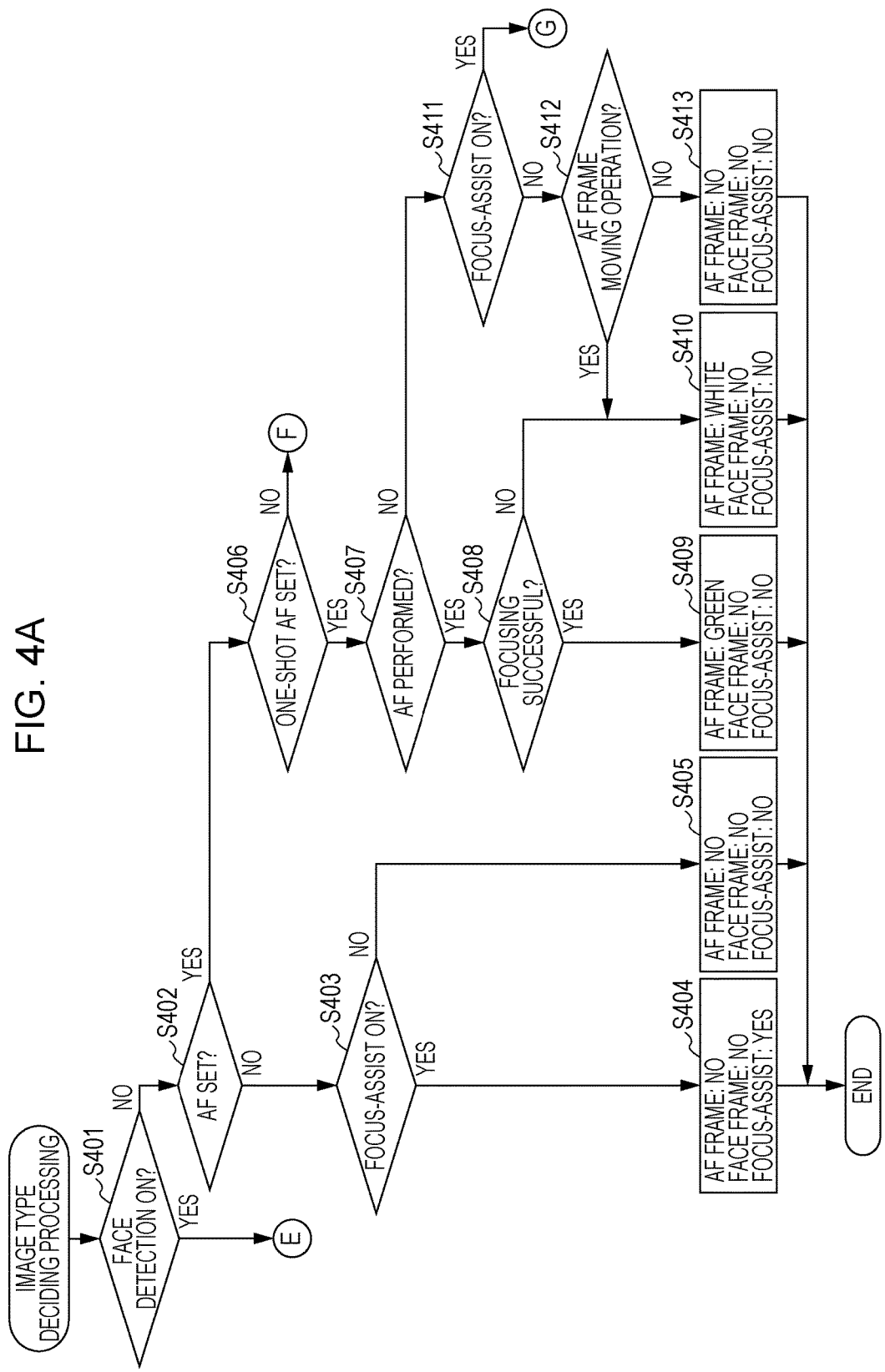
Figure 4C:
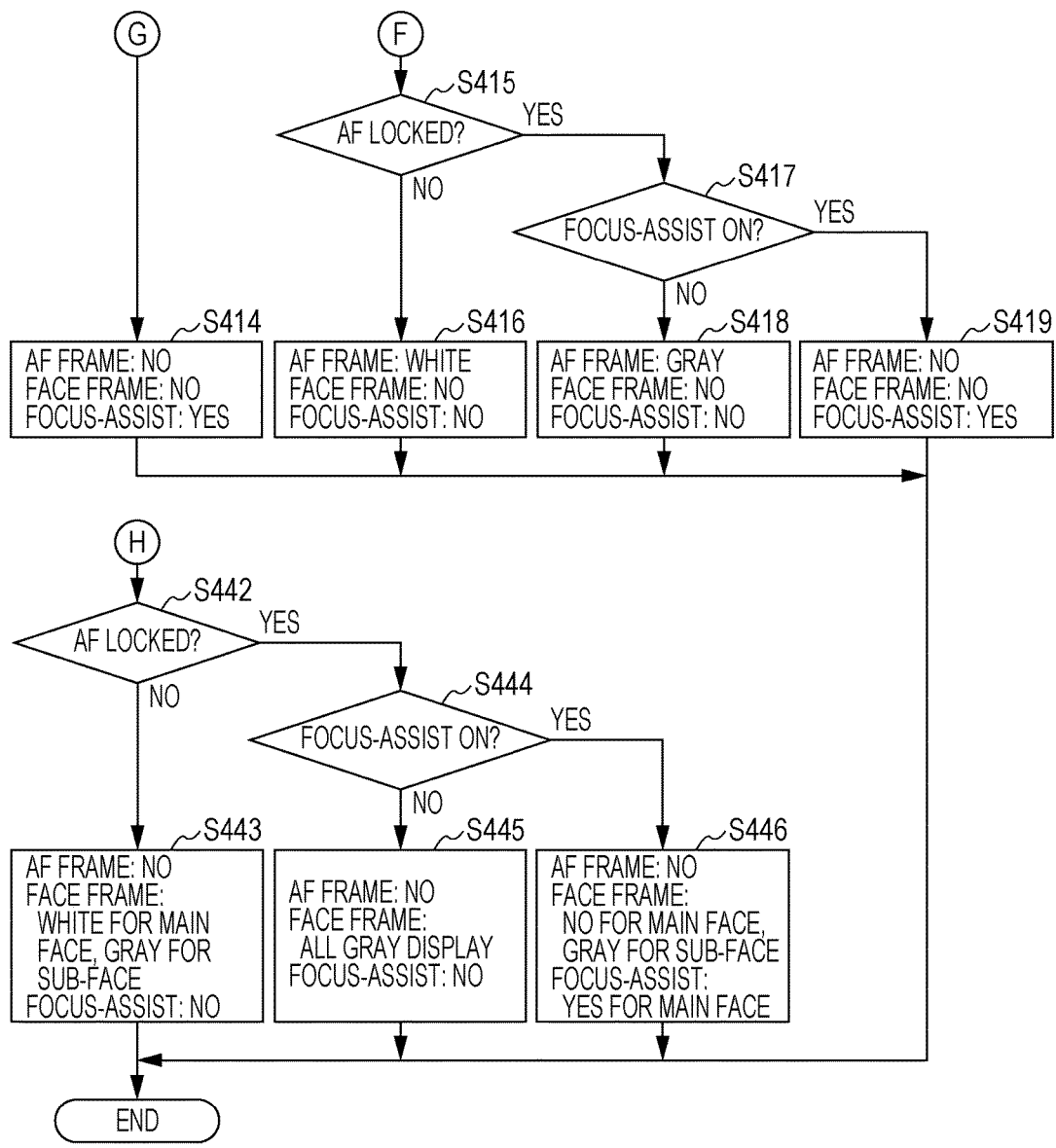

Next, a detailed flow of the screen type deciding processing described in S301 in FIG. 3A will be described. FIGS. 4A through 4C are a flowchart of the screen type deciding processing described in S301 in FIG. 3A.

In S401 in FIG. 4A, the CPU 119*a* references the settings information stored in the ROM 119*b*, and determines whether or not the face detection function is set to on. In a case where the face detection function has been set to on in the aforementioned S315, determination is made here that it is on. If set to on, the flow advances to S430; otherwise, to S402.

In S402, the CPU 119*a* determines whether or not AF has been set by the AF/MF switch 135. If set to AF, the flow advances to S406; otherwise (i.e., if set to MF), to S403.

In S403, the CPU 119*a* references the settings information stored in the ROM 119*b* and determines whether the focus-assist function is set to on. In a case where the focus-assist function has been set to on in the aforementioned S313, determination is made here that it is on. In a case where the focus-assist function has been set to on, the flow advances to S404; otherwise, to S405.

In S404, the CPU 119*a* decides on a display type where face detection is off, the focus mode is set to MF, and focus-assist is on. The screen is set so that AF frame display: no face frame display: no focus-assist display: yes and these settings are held in the RAM 119*c*. As a result, a screen such as illustrated in FIG. 11B above is displayed on the display unit 107.

In S405, the CPU 119*a* decides on a display type where face detection is off, the focus mode is set to MF, and focus-assist is off. The screen is set so that AF frame display: no face frame display: no
focus-assist display: no
and these settings are held in the RAM 119c. As a result, a screen such as illustrated in FIG. 11A above is displayed on the display unit 107.

In S406, the CPU 119a references the settings information stored in the ROM 119b, and determines whether or not the AF mode is set to the one-shot AF mode. In a case where the AF mode has been set to one-shot AF mode in the aforementioned S317, determination is made here that the AF mode is set to the one-shot AF mode. If set to one-shot AF, the flow advances to S407; otherwise (i.e., in a case where the AF mode is set to continuous AF), to S415.

In S407, the CPU 119a determines whether or not AF operations have been performed by one-shot AF. This is a determination of whether or not the one-shot AF key 129 has been pressed in the one-shot AF mode. In a case of determining that one-shot AF has already been performed the flow advances to S408; otherwise (the one-shot AF key 129 has not been pressed yet) to S411.

In S408, the CPU 119a decides whether or not focusing on the AF object by one-shot AF has been successful (whether in-focus has been successfully achieved or not). If in focus, the flow advances to S409; otherwise (one-shot AF operation has been started but in-focus has not been achieved yet) to S410.

In S409, the CPU 119a decides on a display type where face detection is off, the focus mode is set to one-shot AF, and in-focus has been successful. The screen is set so that
  AF frame display: green (indicating in-focus)
  face frame display: no
  focus-assist display: no
and these settings are held in the RAM 119c. As a result, a screen such as illustrated in FIG. 11C above is displayed on the display unit 107, with the AF frame displayed in green.

In S410, the CPU 119a decides on a display type where face detection is off, the focus mode is set to one-shot AF, and in-focus has not been successful yet (undergoing AF operations). The screen is set so that
  AF frame display: white (indicating undergoing AF operations)
  face frame display: no
  focus-assist display: no
and these settings are held in the RAM 119c. As a result, a screen such as illustrated in FIG. 11C above is displayed on the display unit 107, with the AF frame displayed in white.

In S411, the CPU 119a decides whether or not the focus-assist function is set to on, the same as in S403. If the focus-assist function is set to on, the flow advances to S414; otherwise to S412.

In S412, the CPU 119a determines whether or not an AF frame moving operation has been performed. The AF frame can be moved in a direction of a key pressed on the cross key 125, for example. In a case where determination is made that an AF frame moving operation has been performed, the position of the AF frame is moved in accordance with the moving operation and the flow advances to S410; otherwise, to S413. When S410 is reached from S412, the AF frame is displayed in white for a predetermined amount of time (several seconds or se) after the AF frame moving operation has ended, and thereof the AF frame is set to non-display.

In S413, the CPU 119a decides on a display type where face detection is off, the focus mode is set to one-shot AF, and one-shot AF operations have not been performed yet. The screen is set so that
  AF frame display: no
  face frame display: no
  focus-assist display: no
and these settings are held in the RAM 119c. As a result, a screen such as illustrated in FIG. 11A above is displayed on the display unit 107. This screen is an AF standby state before operating the one-shot AF key 129, and is a screen in a case where the focus-assist function is set to off.

In S414 in FIG. 4C, the CPU 119a decides on a display type where face detection is off, the focus-assist function is on, and the focus mode is in one-shot AF mode but the one-shot AF operations have not been performed yet. The screen is set so that
  AF frame display: no
  face frame display: no
  focus-assist display: yes
and these settings are held in the RAM 119c. As a result, a screen such as illustrated in FIG. 11B above is displayed on the display unit 107. In this state, the focus ring 134 can be operated and manual focusing performed. Accordingly, displaying the focus-assist 1101 provides support for the user MF operations. The position of the focus-assist 1101 can be moved, as described regarding S306 through S309 in FIG. 3A. Moving the position of the focus-assist 1101 also moves the ranging position and the AF position. Upon the one-shot AF key 129 being pressed thereafter, the display state in S410 is displayed, and then transitions to the display state in S409. That is to say, in a case where the focus-assist function is set to on in the one-shot AF mode, the focus-assist is displayed at the ranging position before the one-shot AF key 129 is pressed. When the one-shot AF key 129 is pressed, AF is performed at that position, and the focus-assist display is replaced with an AF frame.

In S415, the CPU 119a determines whether or not in the AF locked state. If the AF locked state has been set in the aforementioned S334, determination is made here that the state is the AF locked state. In a case of the AF locked state, the flow advances to S417; otherwise, to S416.

In S416, the CPU 119a decides on a display type where face detection is off, the focus mode is continuous AF mode, and AF lock is not implemented (continuous AF is being executed). The screen is set so that
  AF frame display: white
  face frame display: no
  focus-assist display: no
and these settings are held in the RAM 119c. As a result, a screen such as illustrated in FIG. 11C above is displayed on the display unit 107, where the AF frame 1102 is displayed in white.

In S417, the CPU 119a decides whether or not the focus-assist function is set to on, the same as in S403. If the focus-assist function is set to on, the flow advances to S419; otherwise to S418.

In S418, the CPU 119a decides on a display type where face detection is off, focus-assist function is set to off, and the state is the AF lock state in continuous AF mode. The screen is set so that
  AF frame display: gray
  face frame display: no
  focus-assist display: no
and these settings are held in the RAM 119c. As a result, a screen such as illustrated in FIG. 11D above is displayed on the display unit 107.

In S419, the CPU 119a decides on a display type where face detection is off, the focus-assist function is on, and the state is the AF lock state in continuous AF mode. The screen is set so that
  AF frame display: no
  face frame display: no focus-assist display: yes and these settings are held in the RAM 119*c*. As a result, a screen such as illustrated in FIG. 11B above is displayed on the display unit 107. In this state, the focus ring 134 can be operated and manual focusing performed, as described in S334. Accordingly, displaying the focus-assist 1101 provides support for the user MF operations. The position of the focus-assist 1101 can be moved, as described regarding S306 through S309 in FIG. 3A. Moving the position of the focus-assist 1101 also moves the ranging position and the AF position. Upon disengaging the AF lock and executing continuous AF thereafter, the display state in S416 is displayed, and the focus-assist display 1101 is replaced with the AF frame 1102.

In S430, the CPU 119*a* determines whether or not AF has been set by the AF/MF switch 135. If set to AF, the flow advances to S434; otherwise to S431.

In S431, the CPU 119*a* determines whether the focus-assist function is set to on, in the same way as in S403. If on, the flow advances to S432; otherwise, to S433.

In S432, the CPU 119*a* decides on a display type where face detection is on, the focus mode is set to MF, and focus-assist is on. The screen is set so that
  AF frame display: no
  face frame display: no for main face, gray for sub-face
  focus-assist display: yes at position of main face
and these settings are held in the RAM 119*c*. As a result, a screen such as illustrated in FIG. 11G above is displayed on the display unit 107.

In S433, the CPU 119*a* decides on a display type where face detection is on, the focus mode is set to MF, and focus-assist is off. The screen is set so that
  AF frame display: no
  face frame display: gray for main face and sub-face
  focus-assist display: no
and these settings are held in the RAM 119*c*. As a result, a screen such as illustrated in FIG. 11F above is displayed on the display unit 107.

In S434, the CPU 119*a* determines whether or not the AF mode is set to the one-shot AF mode, in the same way as in S406. If set to one-shot AF, the flow advances to S435; otherwise, to S442.

In S435, the CPU 119*a* determines whether or not AF operations have been performed by one-shot AF, the same as in S407. In a case of determining that one-shot AF has already been performed the flow advances to S436; otherwise to S439.

In S436, the CPU 119*a* decides whether or not focusing on the AF object by one-shot AF has been successful, in the same way as in S408. If in focus, the flow advances to S437; otherwise to S438.

In S437, the CPU 119*a* decides on a display type where face detection is on, the focus mode is set to one-shot AF mode, and the focus state is in-focus as a result of having performed one-shot AF. The screen is set so that
  AF frame display: no
  face frame display: green for main face, gray for sub-face
  focus-assist display: no
and these settings are held in the RAM 119*c*. As a result, a screen such as illustrated in FIG. 11E above is displayed on the display unit 107, with the face frame 1106 displayed in green.

In S438, the CPU 119*a* decides on a display type where face detection is on, the focus mode is set to one-shot AF, and in-focus has not been successful yet (undergoing AF operations). The screen is set so that
  AF frame display: no
  face frame display: white for main face, gray for sub-face
  focus-assist display: no
and these settings are held in the RAM 119*c*. As a result, a screen such as illustrated in FIG. 11E above is displayed on the display unit 107, with the face frame 1106 displayed in white.

In S439, the CPU 119*a* decides whether or not the focus-assist function is set to on, the same as in S403. If the focus-assist function is set to on, the flow advances to S441; otherwise to S440.

In S440, the CPU 119*a* decides on a display type where face detection is on, the focus-assist function is off, and the focus mode is one-shot AF with one-shot AF not having been performed yet. The screen is set so that
  AF frame display: no
  face frame display: gray for main face and sub-face
  focus-assist display: no
and these settings are held in the RAM 119*c*. As a result, a screen such as illustrated in FIG. 11F above is displayed on the display unit 107.

In S441, the CPU 119*a* decides on a display type where face detection is on, the focus-assist function is on, and the state is the one-shot AF mode where no one-shot AF operation has been performed yet. The screen is set so that
  AF frame display: no
  face frame display: no for main face and gray for sub-face
  focus-assist display: yes at the position of main face
and these settings are held in the RAM 119*c*. As a result, a screen such as illustrated in FIG. 11G above is displayed on the display unit 107. In this state, the focus ring 134 can be operated and manual focusing performed, as described in S334. Accordingly, displaying the focus-assist 1101 provides support for the user MF operations. Pressing the one-shot AF key 129 thereafter transitions through the display state in S438 to the display state in S437. That is to say, in a case where the focus-assist function is set to on in the one-shot AF mode, the focus-assist is displayed at the ranging position before pressing the one-shot AF key 129. Once the one-shot AF key 129 is pressed, face AF is performed at that position, and the focus-assist is replaced by a face frame display where in focus.

In S442, the CPU 119*a* determines whether or not if in the AF lock state, in the same way as in S415. If the AF lock state, the flow advances to S444; otherwise to S443.

In S443, the CPU 119*a* decides on a display type where face detection is on, and continuous AF is being performed. The screen is set so that
  AF frame display: no
  face frame display: white for main face, gray for sub-face
  focus-assist display: no
and these settings are held in the RAM 119*c*. As a result, a screen such as illustrated in FIG. 11E above is displayed on the display unit 107, with the face frame 1106 displayed in white.

In S444, the CPU 119*a* decides whether or not the focus-assist function is set to on, the same as in S403. If the focus-assist function is set to on, the flow advances to S446; otherwise to S445.

In S445, the CPU 119*a* decides on a display type where face detection is on, the focus-assist function is off, and in the AF lock state when in the continuous AF mode. The screen is set so that
  AF frame display: no
  face frame display: gray for main face and sub-face
  focus-assist display: no and these settings are held in the RAM 119*c*. As a result, a screen such as illustrated in FIG. 11F above is displayed on the display unit 107.

In S446, the CPU 119*a* decides on a display type where face detection is on, the focus-assist function is on, and the state is the continuous AF mode in the AF lock state. The screen is set so that AF frame display: no face frame display: no for main face and gray for sub-face focus-assist display: yes at the position of main face and these settings are held in the RAM 119*c*. As a result, a screen such as illustrated in FIG. 11G above is displayed on the display unit 107. In this state, the focus ring 134 can be operated and manual focusing performed, as described in S334. Accordingly, displaying the focus-assist 1101 provides support for the user MF operations. Disengaging the AF lock state thereafter and performing continuous AF transitions to the display state in S443, and the focus-assist 1101 is replaced by the face frame 1106.

Focus-Assist Display Processing

Figure 5:
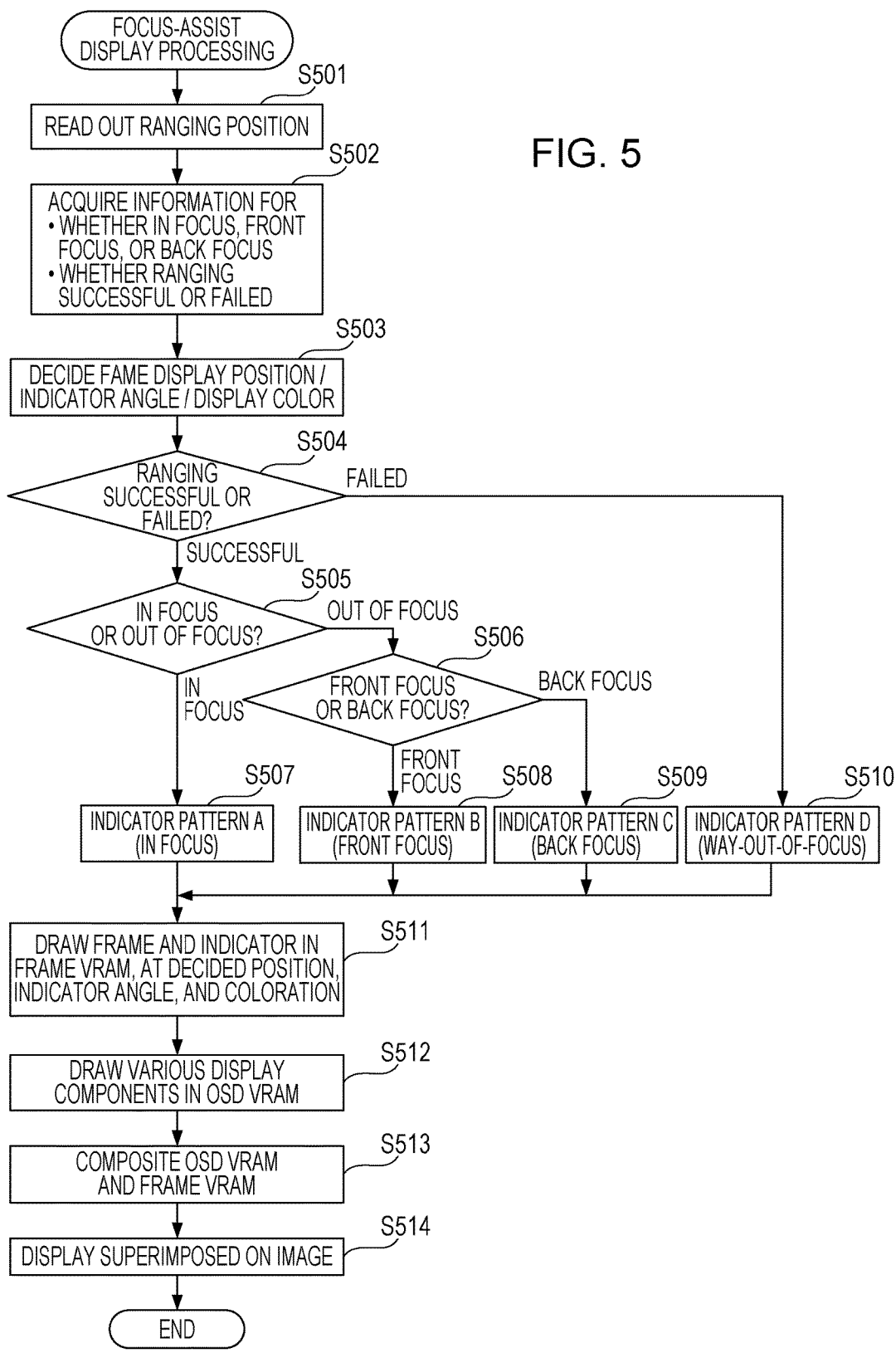
FIG. 5 is a flowchart of focus-assist display processing.

FIG. 5 is a flowchart illustrating the focus-assist display processing mentioned above in S304 in FIG. 3A in detail. In S501, the CPU 119*a* reads out the ranging position (focus detection position) held in the RAM 119*c*.

In S502, the CPU 119*a* acquires focus information and information relating to whether or not ranging was successful from the ranging unit 108, for a subject corresponding to the ranging position acquired in S501. As described earlier, focus information includes information regarding which of in-focus/front-focus/back-focus the state is, and the degree of in-focus, calculated by the defocussing amount.

In S503, the CPU 119*a* decides the frame display position of the focus-assist (assist display or focus guide display) that the GPU 115 draws, indicator angle, and display color, based on the information acquired in S501 and S502. The frame display position is decided to be at the ranging position. The indicator angle is decided based on the information of whether in focus, front focus, or back focus, and the degree of in-focus if front focus or back focus. The display color is decided based on the information of whether in focus, front focus, or back focus, and information of whether or not ranging was successful. Details will be described later.

In S504, the CPU 119*a* references ranging success information acquired in S502, and determines whether or not ranging was successful. If successful, the flow advances to S505; otherwise to S510.

In S505, the CPU 119*a* determines whether the subject is in an in-focus state or an out-of-focus state, based on the information acquired in S502. If in an in-focus state the flow advances to S507, and if in an out-of-focus state, to S506.

In S506, the CPU 119*a* determines whether the subject is in a front focus state or a back focus state, based on the information acquired in S502. If in a front focus state the flow advances to S508, and if in a back focus state to S509.

Figure 8A:
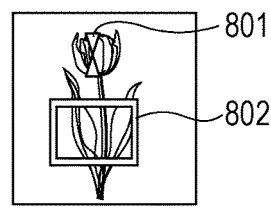
FIGS. 8A through 8D are focus-assist display examples.

In S507, the CPU 119*a* selects indicator pattern A, which is focus-assist data corresponding to an indicator display form in a case where the subject is in focus. A display example of data of this indicator and frame is illustrated in FIG. 8A. An indicator 801 indicates an in-focus state (a state where the subject in the focus detection region is in focus) where a later-described indicator 804 and indicator 805 are overlapping each other and integrated, and further adjacent to an indicator 803 (a position indicated by the indicator 803). The color is green, which is different from other states. By using this expression, the display area of the indicator is smaller at the focus position and nearby, as compared to other forms, and thus affects the visibility of the picture less when viewed by the photographer. A frame 802 indicates a region corresponding to the ranging position acquired in S501 on the live view image.

Figures 1, 8B:
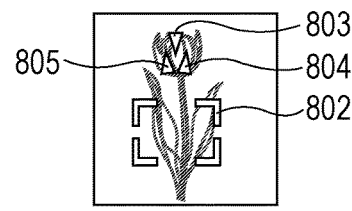
Figures 2, 8B:
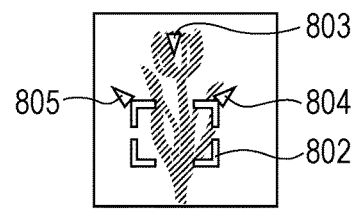

In S508, the CPU 119*a* selects indicator pattern B, which is focus-assist data corresponding to an indicator display form in a case where the subject is in a front focus state. Display examples of data of the indicators and frame are illustrated in FIGS. 8B1 and 8B2. The indicator 803 indicates a target point of indicator 804 and indicator 805 to head toward an in-focus state, represented by white triangles pointing to the frame 802. The indicator 804 and indicator 805 represent the degree of in-focus at the ranging position by the distance from each other, represented as triangles pointing away from the frame 802. When the distance between the subject and the digital camera 10 changes, the degree of in-focus changes, so the gap between the displayed positions of the indicator 804 and indicator 805 dynamically changes to be wider or narrower accordingly. The distance (angle) between the indicator 804 and indicator 805 changes such that the displayed distance is smaller in a case where the degree of off-focus is smaller (narrower, the angle is smaller) as compared to a case where the degree of off-focus is large in the focus detection region, based on the degree of in-focus information. That is to say, FIG. 8B1 represents a case where the subject is in a small out-of-focus state (the degree of off-focus is small), while FIG. 8B2 represents a case where the subject is in a large out-of-focus state (the degree of off-focus is large). This arrangement where the indicator 803 and indicator 804 and indicator 805 are triangles of which the vertices face each other in the neighborhood of in-focus enables slight off-focus states to be easily visually recognized. Each indicator is displayed in the neighborhood of the frame 802, so the photographer can confirm the in-focus state without looking far away from the subject. In a case where focus-assist displays are enabled for multiple positions, the correlation between each frame and the indicators can be easily comprehended.

Figures 1, 8C:
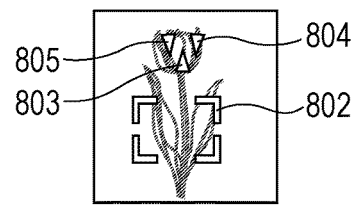
Figures 2, 8C:
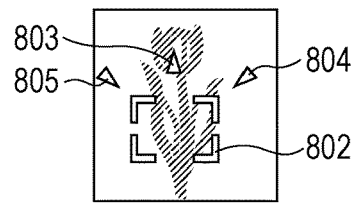

In S509, the CPU 119*a* selects indicator pattern C, which is focus-assist data corresponding to an indicator display form in a case where the subject is in a back focus state. Display examples of data of the indicators and frame are illustrated in FIGS. 8C1 and 8C2. Unlike FIGS. 8B1 and 8B2, the indicator 803 is represented as a white triangle point away from the frame 802, and the indicator 804 and indicator 805 are represented as white triangles heading away from the frame 802. Accordingly, whether the state is front focus or back focus can be comprehended in a glance. FIG. 8C1 represents a case where the subject is in a small out-of-focus state (the degree of off-focus is small), while FIG. 8C2 represents a case where the subject is in a large out-of-focus state (the degree of off-focus is large).

Figure 8D:
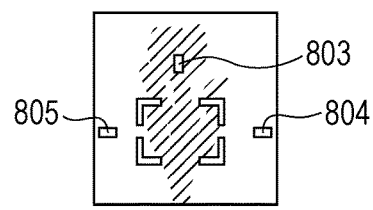

In S510, the CPU 119*a* selects indicator pattern D, which is focus-assist data corresponding to an indicator display form in a case where the subject is in a way-out-of-focus state. Display examples of data of the indicators and frame are illustrated in FIG. 8D. The indicator 803, indicator 804, and indicator 805 are each represented as square shapes, which is different from the shapes of the indicates in FIGS. 8A through 8C2. The display color of these indicators is gray. This visually indicates that determination of front-focus/back-focus has failed (i.e., ranging has failed), and the state is a way-out-of-focus state.

In S511, the CPU 119*a* draws the indicator and frame data selected in one of S507 through S510, at the display position, indicator angle, and display color, decided in S503, at the frame display VRAM using the GPU 115.

In S512, the CPU 119a draws the various types of display elements other than focus-assist at on-screen display (OSD) VRAM.

In S513, the CPU 119a composites the OSD VRAM drawn in S512 upon the frame display VRAM drawn in S511, using the GPU 115.

Figure 9A:
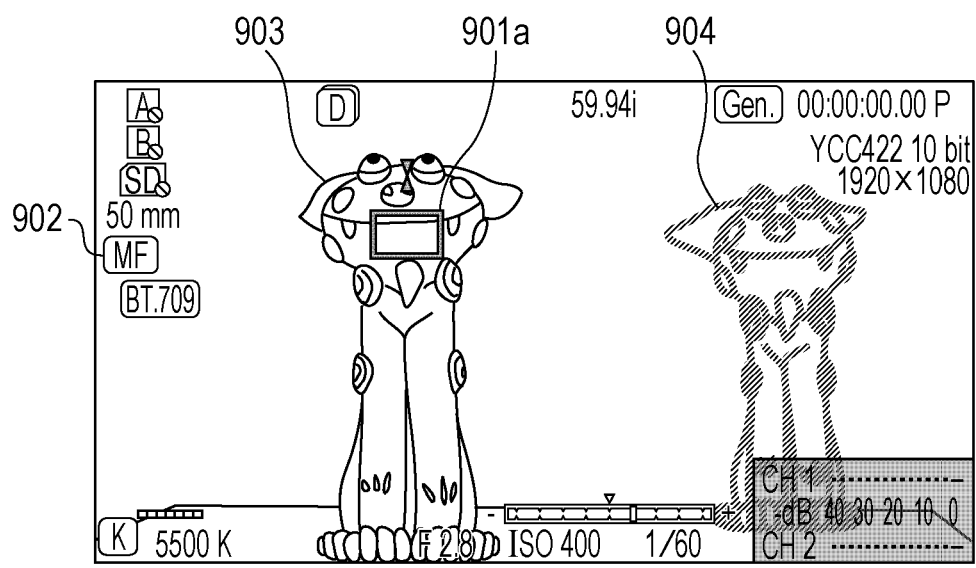
FIGS. 9A and 9B are screen display example during focus-assist display.
Figure 9B:
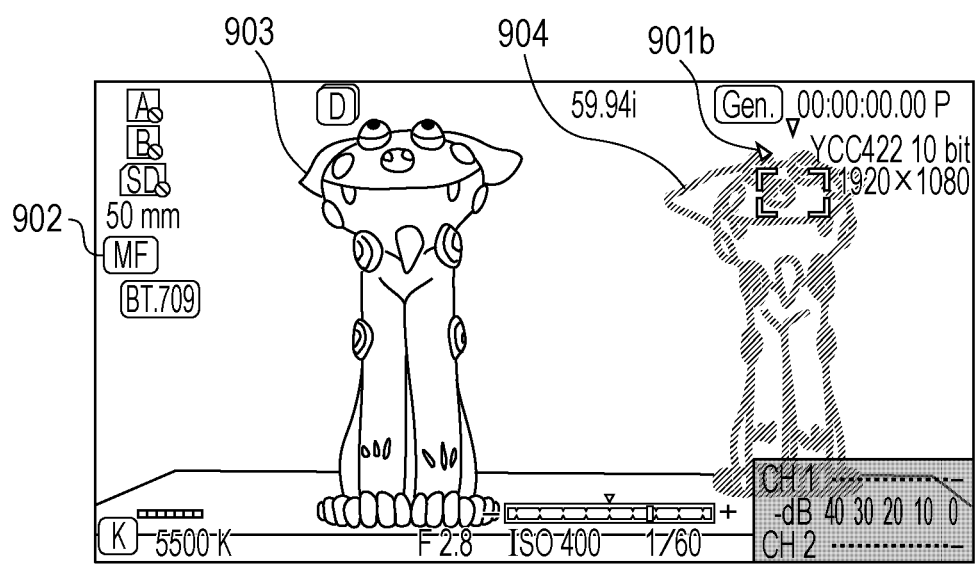

In S514, the CPU 119a superimposes the VRAM composited in S513 with the video (live view image) at the display interface unit 106, and displays on the display unit 107. FIGS. 9A and 9B illustrate the configuration of the screen displayed on the display unit 107 at this time. A focus-assist 901a and a focus-assist 901b are both configured using the frame and indicators illustrated in FIGS. 8A through 8D. Icon 902 indicates that the focus mode has been set to MF by the AF/MF switch 135. A subject 903 and a subject 904 are subjects imaged by the imaging device 102 (part of the live view image). Other information display elements that have less relationship with the present invention are also displayed in the screen. These are drawn in in S512, but are not denoted by any reference numerals. In FIG. 9A, the ranging position obtained in S501 corresponds to the subject 903, and the subject 903 is in an in-focus state. On the other hand, FIG. 9B illustrates a state where the ranging position has been moved from that in FIG. 9A using the cross key 125 or dial 126. The ranging position is at the position of the subject 904, and the subject 904 is in a front focus state. Part of the indicator for the focus-assist 901b is hidden beneath another display element due to the compositing in S513 (i.e., the superimposing was performed with another display element laid upon it). The indicators are three shapes, so even in such a state, the focus state can be confirmed by the other exposed indicators.

Thus, the focus-assist indicates which way the focus ring 134 should be operated by how much, until the subject at the ranging position (focus detection position) is in focus. In other words, the focus-assist indicates the degree of in-focus of the ranging position (the degree of off-focus). Further restated, the focus-assist represents the difference between the focal length when the subject at the ranging position is in focus, and the current focal length. Yet another way of saying this is that the focus-assist represents the relationship between the focus position (the position that currently is in focus and the digital camera 10) and the distance to subject (the distance between the digital camera 10 and the subject).

Modification of Display Form of Focus-Assist

Figure 10A:
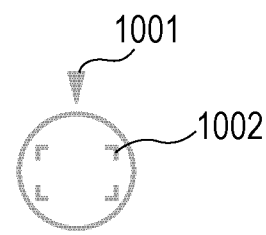
FIGS. 10A through 10C are other display examples of focus-assist.
Figure 10B:
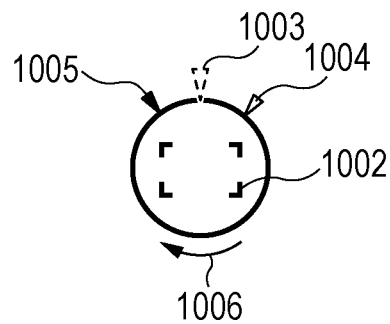
Figure 10C:
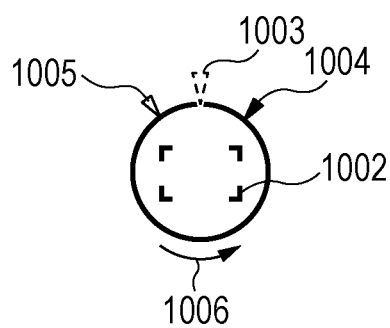

Another example of display forms of the frame and indicators illustrated in FIGS. 8A through 8D is illustrated in FIGS. 10A through 10C. FIG. 10A illustrates an in-focus state corresponding to FIG. 8A. An indicator 1001 corresponds to the indicator 801, and a frame 1002 corresponds to the frame 802. The indicator 1001 is an expression of the three of a later-described indicator 1003 and indicator 1004 and indicator 1005 being overlaid and integrated. This affects the visibility of the picture less when viewed by the photographer, in the same way as in FIG. 8A.

FIG. 10B is a front focus state corresponding to FIG. 8B2. An indicator 1003 corresponds to the indicator 803, and indicator 1004 corresponds to the indicator 804, and an indicator 1005 corresponds to the indicator 805. An arrow 1006 indicates the direction for rotation of the focus ring 134 to head toward in-focus. Accordingly, even in a case where the photographer is not accustomed to the operation of the focus ring 134, the focus ring 134 can be operated in the in-focus direction without guessing the direction of rotation. In a case where the display unit 107 can be folded out, rotated, flipped, or otherwise changed with regard to orientation, this can change the way in which the arrow should be displayed with regard to the orientation and position of the display unit 107 as to the focus ring 134. An arrangement may be made where the state of orientation is detected and the arrow 1006 is properly drawn to reflect this.

FIG. 10C is a back focus state corresponding to FIG. 8C2. The indicator 1004 and indicator 1005 are in reversed positions as compared to FIG. 10B. Accordingly, the photographer can tell whether front focus or back focus in a glance. The arrow 1006 is pointing in the opposite direction from FIG. 10B, indicating that the rotation direction of the focus ring 134 for operation in the in-focus direction is opposite.

Image Size Settings Switching Processing (Crop Settings)

The image size settings switching processing described earlier in S318 and S319 in FIG. 3 will be described. The digital camera 10 has an item regarding image size settings (resolution settings) in the menu items of the menu screen. When the user selects the menu item for the image size settings, a sub-menu having the following options is displayed, and the user can select any one of the options.

Setting 1 . . . 4K: 4096 pixels×2160 pixels
Setting 2 . . . 4K: 3840 pixels×2160 pixels
Setting 3 . . . 2K: 2048 pixels×1080 pixels
Setting 4 . . . 2K: 1920 pixels×1080 pixels
Setting 5 . . . 2K cropped: 2048 pixels×1080 pixels
Setting 6 . . . 2K cropped: 1920 pixels×1080 pixels Setting 1 is the largest size that can be set to the digital camera 10. The maximum number of pixels of the imaging device 102 is somewhat larger than 4096 pixels×2160 pixels, but the largest size (effective pixels) that can be set as the image size (number of recording pixels) is 4096 pixels×2160 pixels.

Settings 3 and 4 are sizes where an image read, out from the same range and the same number of pixels of the imaging device 102 as the settings 1 and 2, has been reduced and resized. Accordingly, there are each pictures having the same field angle as the case of the settings 1 and 2.

Settings 5 and 6 settings where readout is performed only from pixels at a partial range of the imaging device 102 including the middle (Setting 5 is a range of 2048 pixels×1080 pixels from the middle of the imaging device 102, and Setting 6 is a range of 1920 pixels×1080 pixels from the middle of the imaging device 102). That is to say, these are images of a narrower field angle than the Settings 1 through 4, using only pixels from a narrower range than the Settings 1 through 4. That is to say, these are sizes where a partial region including the middle of the imaging device 102 has been cut out. Shooting using Settings 5 and 6 will be collectively referred to as "crop mode". An arrangement may be made where the crop mode is not a menu item in the same hierarchical level as the Settings 1 through 6, but rather an option called "crop mode" in the first hierarchical level in the image size settings, which, when selected, enables selection of 2048 pixels×1080 pixels or 1920 pixels×1080 pixels from a crop mode sub-menu.

In a case where the crop mode has been set in the present embodiment, determination is made regarding whether or not the ranging position is within the shooting range in the crop mode, and if not, the ranging position is changed to the middle. This concept will be described with reference to FIGS. 12A through 12H.

Figure 12A:
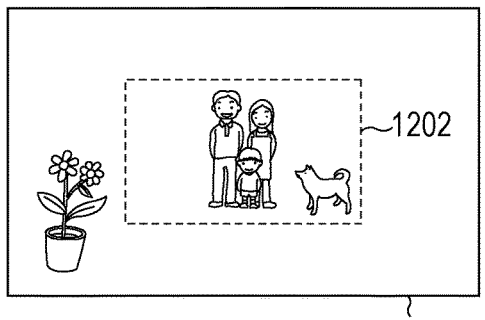
FIGS. 12A through 12H are screen display examples of maximum size and screen display examples in crop mode.

FIG. 12A is an example of an image that has been imaged at the largest size (Setting 1). Shooting has been performed using pixels of the imaging device 102 of a range corresponding to the largest size, so an image having a shooting range 1201 is acquired. A crop range 1202 represents the range that is cut out in crop shooting.

Figure 12B:
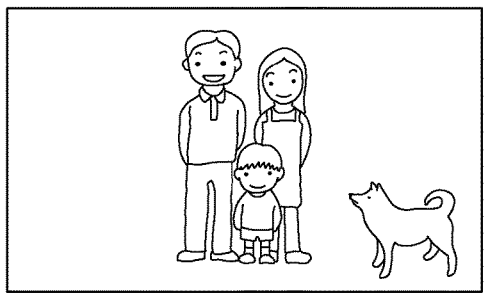

FIG. 12B is an example of an image that has been imaged by pixels of the imaging device 102 in a range corresponding to the crop range 1202 in FIG. 12A.

Figure 12C:
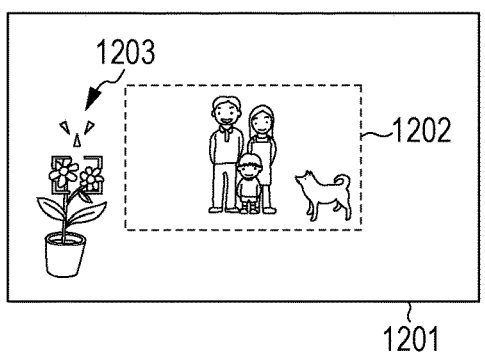

FIG. 12C is a display example of a focus-assist 1203 and live view image in a case where the largest size (Setting 1) has been set and the ranging position is in a region outside of the crop range 1202.

Figure 12D:
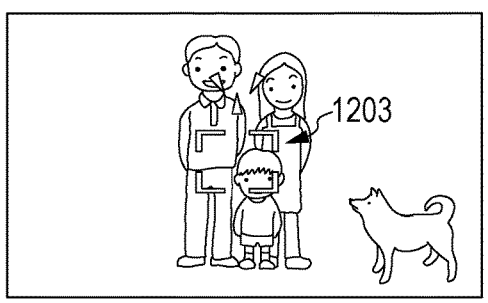

FIG. 12D is a display example of the focus-assist 1203 and live view image in a case where the image size settings have been switched from the state in FIG. 12C to the crop mode (i.e., the image size has been set to one of Settings 5 and 6). The ranging position is in a region outside of the crop range 1202 in FIG. 12C, so in accordance with the changing to the crop mode, the ranging position has been changed to the middle of the shooting range in the crop mode (the middle of the imaging device 102). Even in the crop mode, the size of the region for ranging itself does not change on the imaging device 102. That is to say, the size of the live view image as to the imaging device 102 becomes smaller (the shooting range is narrower) in the crop mode, so the ranging range (focus detection range) as to the live view image increases relatively. Accordingly, the focus-assist 1203 displayed superimposed on the live view image is also larger in FIG. 12D as compared to FIG. 12C.

Figure 12E:
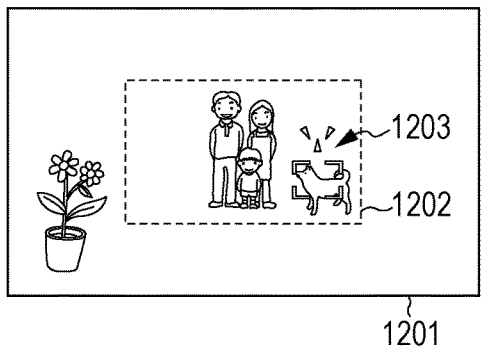

FIG. 12E is a display example of a focus-assist 1203 and live view image in a case where the largest size (Setting 1) has been set and the ranging position is in a region inside of the crop range 1202.

Figure 12F:
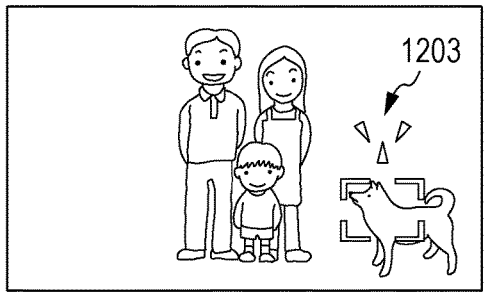

FIG. 12F is a display example of the focus-assist 1203 and live view image in a case where the image size settings have been switched from the state in FIG. 12E to the crop mode (a case where the image size is set to Setting 5 or 6). The ranging position is inside the crop range 1202 in FIG. 12E, so The ranging position is not changed even when changing to the crop mode. That is to say, unless the digital camera 10 or the subject moves, the focus-assist 1203 is set at a position on the same subject (illustrated here as the head of the dog) before and after switching to the crop mode.

Figure 12G:
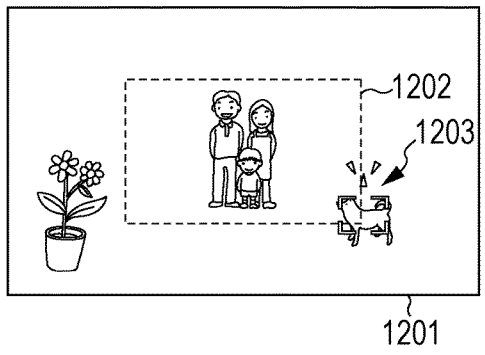
Figure 12H:
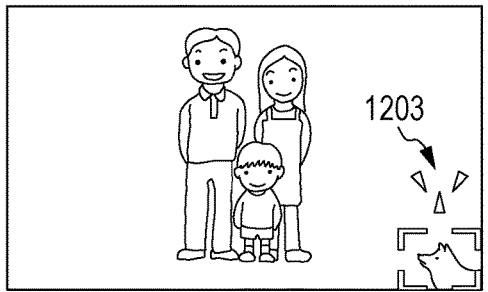

Also, in a case where the frame of the focus-assist 1203 indicating the ranging position in the largest size (Setting 1) is partially inside and partially outside the crop range 1202 as illustrated in FIG. 12G, the ranging position (ranging range) after switching to the crop mode is as illustrated in FIG. 12H. That is to say, the ranging position is moved so that the entire ranging range fits within the shooting range in crop mode. In this case, the ranging position does not move to the middle.

In a case of disengaging the crop mode (a case of switching from one of Settings 5 and 6 to one of Settings 1 through 4), the ranging position does not change (is maintained). That is to say, if the image size settings are changed from the state in FIG. 12F to Setting 1, the focus-assist 1203 is displayed at the position illustrated in FIG. 12E.

FIG. 6 illustrates a flowchart of image size settings switching processing. This processing is S319 of FIG. 3 in detail.

In S601, the CPU 119a determines whether or not the crop mode has been set. That is to say, determination is made regarding whether or not one of Setting 5 and Setting 6 has been set out of the Settings 1 through 6 described above. In a case where the crop mode has been set (set to either Setting 5 or Setting 6), the flow advances to S602; otherwise, to S607.

In S602, the CPU 119a changes the reading region from the sensor (imaging device 102) to the crop range corresponding to the crop mode that has been set. That is to say, in a case where the Setting 5 has been set, the reading region is set to a range 2048 pixels×1080 pixels centered on the middle of the imaging device 102. In a case where the Setting 6 has been set, the reading region is set to a range 1920 pixels×1080 pixels centered on the middle of the imaging device 102.

In S603, the CPU 119a determines whether or not the current ranging position and the entire ranging range are on the outside of the reading range (crop range) set in S602. In a case where determination is made that the entire ranging range is on the outside of the crop range, the flow advances to S604; otherwise, to S605.

In S604, the CPU 119a changes the ranging position to the middle of the imaging device 102 (the middle of the shooting range). Accordingly, the ranging position is changed such as illustrated in FIGS. 12C and 12D described above, and the display position of the focus-assist 1203 is also updated.

In S605, the CPU 119a determines whether or not the current ranging range is partially on the outside of the crop range (partially within the crop range). In a case where determination is made that not all but part of the ranging range is on the outside of the crop range, the flow advances to S606. Otherwise, i.e., in a case where the entire ranging range is within the crop range, the flow advances to S608 without changing the ranging position.

In S606, the CPU 119a changes the ranging position to a position so that the entire ranging range fits within the crop range. More specifically, in a case where a part of the ranging range was extending out from the crop range just in the X direction (horizontal direction) before changing the ranging position, the position in the Y direction (vertical direction) is not moved, and the ranging position is moved toward the inner side of the crop range in parallel to the X axis, by an amount equivalent to the amount extending outwards. In a case where a part of the ranging range was extending out from the crop range just in the Y direction (vertical direction) before changing the ranging position, the position in the X direction (horizontal direction) is not moved, and the ranging position is moved toward the inner side of the crop range in parallel to the Y axis, by an amount equivalent to the amount extending outwards. In a case where a part of the ranging range was extending out from the crop range in both the X direction and Y direction before changing the ranging position, the ranging position is moved such that the ranging range fits within the crop range, with a vertex of the crop range closest to the ranging position before changing matches a vertex of the ranging range after changing. Accordingly, the ranging position is changed from the state in FIG. 12G to 12H described above, and the display position of the focus-assist 1203 is also updated. An arrangement may be made where the processing of S605 and S606 is not performed, with the flow advances to S604 and setting the ranging position to the middle in a case where even a portion of the ranging range is outside of the crop range.

In S607, the image size settings are set to a setting set by the user other than the crop mode (the above-described Settings 1 through 4), and information indicating the setting value is recorded in the ROM 119b.

The processing in S604 and S606 described above is performed regardless of whether the settings of the focus-assist function are on or off. That is to say, the processing in S604 and S606 is performed in a case where all or part of the ranging range is outside of the crop range when set to the crop mode, even if the settings of the focus-assist function are off.

In a case where the menu is closed to the live view screen after the crop mode has been set by the processing described in FIG. 6, screen transition such as described by way of FIGS. 12C through 12H takes place.

Enlargement Processing

Enlargement processing will be described. Pressing the enlargement key 131 (enlargement button) during live view in normal scale (a scale where the entire live view image of the shooting range corresponding to the recording size just fits in the display unit 107) transitions the digital camera 10 according to the present embodiment to an enlargement mode. The live view image is displayed on the display unit 107 in an enlarged manner in the enlargement mode. When transitioning to the enlargement mode by pressing the enlargement key 131, initially, the enlargement scale displayed last in the previous enlargement mode (one of 2x, 4x, and 8x) is used for the enlarged display. Note that the default value is 2x, and in a case where the enlargement mode is first transitioned to after turning on the power, the enlarged display is made at 2x scale. While in the enlargement mode, each time the set key 127 is pressed, the enlargement scale switches in the order of 2x→4x→8x→2x and so on. When the enlargement key 131 is pressed while in the enlargement mode, the enlargement mode is exited regardless of the scale, and returns to a live view display in the normal scale.

In a case where the focus-assist function set in S313 in FIG. 3 is on, and in a case where the focus mode is set to AF by the AF/MF switch 135, enlargement is performed with the ranging position (the same as the AF position in the case of AF) as the center. That is to say, in a case where the focus-assist has been displayed before enlarging, the enlargement range is decoded so that the frame of the focus-assist is at the center. In a case where the ranging position is near the edge of the shooting range, the ranging position may not necessarily be the center of the enlargement range. A range is enlarged that includes the ranging position but does not cross over outside of the shooting range. That is to say, an enlarged display is made so that there is no blank portion where the image is missing when performing the enlarged display. In any case, the enlarged display is performed so that the ranging position (center of ranging range) is included in the enlarged range, based on the ranging position set before enlarging.

On the other hand, in a case where the focus-assist function set in S313 in FIG. 3 is off, and also the focus mode is set to MF by the AF/MF switch 135, enlargement is performed with the middle of the shooting range as the center, regardless of the ranging position.

Figure 13A:
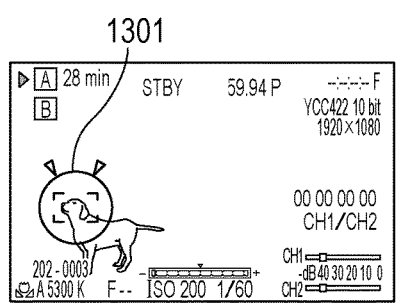
FIGS. 13A through 13E are screen display examples before and after enlargement processing in accordance with focus-assist function settings.
Figure 13B:
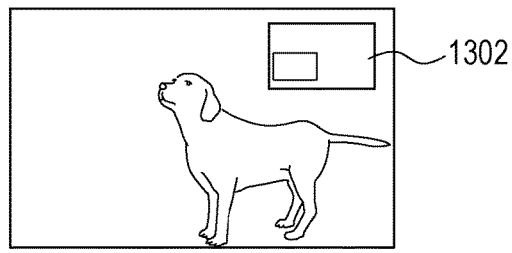

Transition of screens relating to enlarged display will be described with reference to FIGS. 13A through 13E. FIG. 13A is a display example on the display unit 107 in a case where the focus-assist function set in S313 in FIG. 3 is on, and in a case where the focus mode is set to MF by the AF/MF switch 135. A focus-assist 1301 is displayed superimposed on the live view image. When the enlargement key 131 is pressed in this state, the live view image is enlarged and displayed so that the ranging position (the position where the focus-assist 1301 was displayed) is the center, as illustrated in FIG. 13B. An enlargement range guide 1302 indicating which range of the overall shot range is being displayed enlarged, is displayed.

Figure 13C:
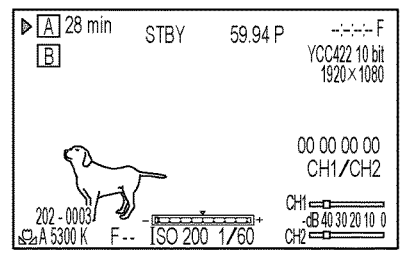
Figure 13D:
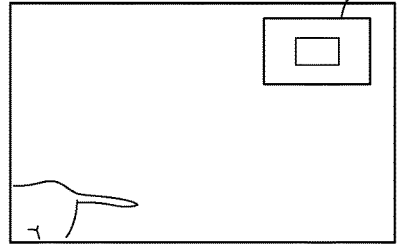

From the state in FIG. 13A, opening the menu screen and setting the focus-assist function to off, and then closing the menu screen, brings up a display such as illustrated in FIG. 13C on the display unit 107, as described in S310 through S313 in FIGS. 3A and 3B. The focus-assist function has been set to off, so no focus-assist 1301 is displayed on the live view image. Pressing the enlargement key 131 in this state performs an enlarged display of the live view image such as illustrated in FIG. 13D, centered not on the ranging position but on the center of the shooting range. In the present embodiment, the ranging position held in the RAM 119c is updated to the enlarged center position at this time. That is to say, the ranging position is changed to the middle of the shooting range and stored. Pressing the enlargement key 131 again in the state in FIG. 13D disengages the enlargement mode. Further, opening the menu screen and setting the focus-assist function to on beings up the display in FIG. 13E, as described in S310 through S313 in FIGS. 3A and 3B. The ranging position has been changed to the middle of the shooting range at this time, so the position of the focus-assist 1301 is the middle of the shooting range, unlike the case in FIG. 13A. Thus, in a case of performing enlarged display of a live view image with the focus-assist function set to off and the focus mode set to MF, the ranging position regarding which assistance is to be provided by the focus-assist 1301 is changed based on the enlarged range in the present embodiment. Even if the focus-assist is not being displayed due to having set the Display level to non-display of information, the ranging position is not associated with the enlarged range when enlarged display is performed, as long as the focus-assist function is on.

Screen transition due to having switched the Display level will be described with reference to FIGS. 14A through 14C. FIG. 14A is a display example on the display unit 107 in a case where the focus-assist function set in S313 in FIG. 3 is on, and in a case where the focus mode is set to MF by the AF/MF switch 135, in the same way as FIG. 13A. When the enlargement key 131 is pressed from this state, a display is made such as illustrated in FIG. 14B, and upon disengaging thereafter, the display returns to that in FIG. 14A. This screen transition is the same as that from FIG. 13A to FIG. 13B, and from FIG. 13B to FIG. 13A. On the other hand, switching the Display level from the state in FIG. 14A to a non-display state of information, the display is such as illustrated in FIG. 14C, with no focus-assist 1301 displayed. In a case of performing an enlarged display from this state, a range centered on the ranging position is enlarged based on the ranging position held in the RAM 119c, so the display will be like that illustrated in FIG. 14B. Disengaging the enlargement thereafter brings up the display of FIG. 14C, and changing the settings for the focus-assist function to on thereafter brings up the display of FIG. 14A. That is to say, in a case of performing enlarged display in a case where the focus-assist is not being displayed due to having set to non-display of information, the ranging position is not associated with the enlarged range when enlarged display is performed, as long as the focus-assist function is on.

Figure 7A:
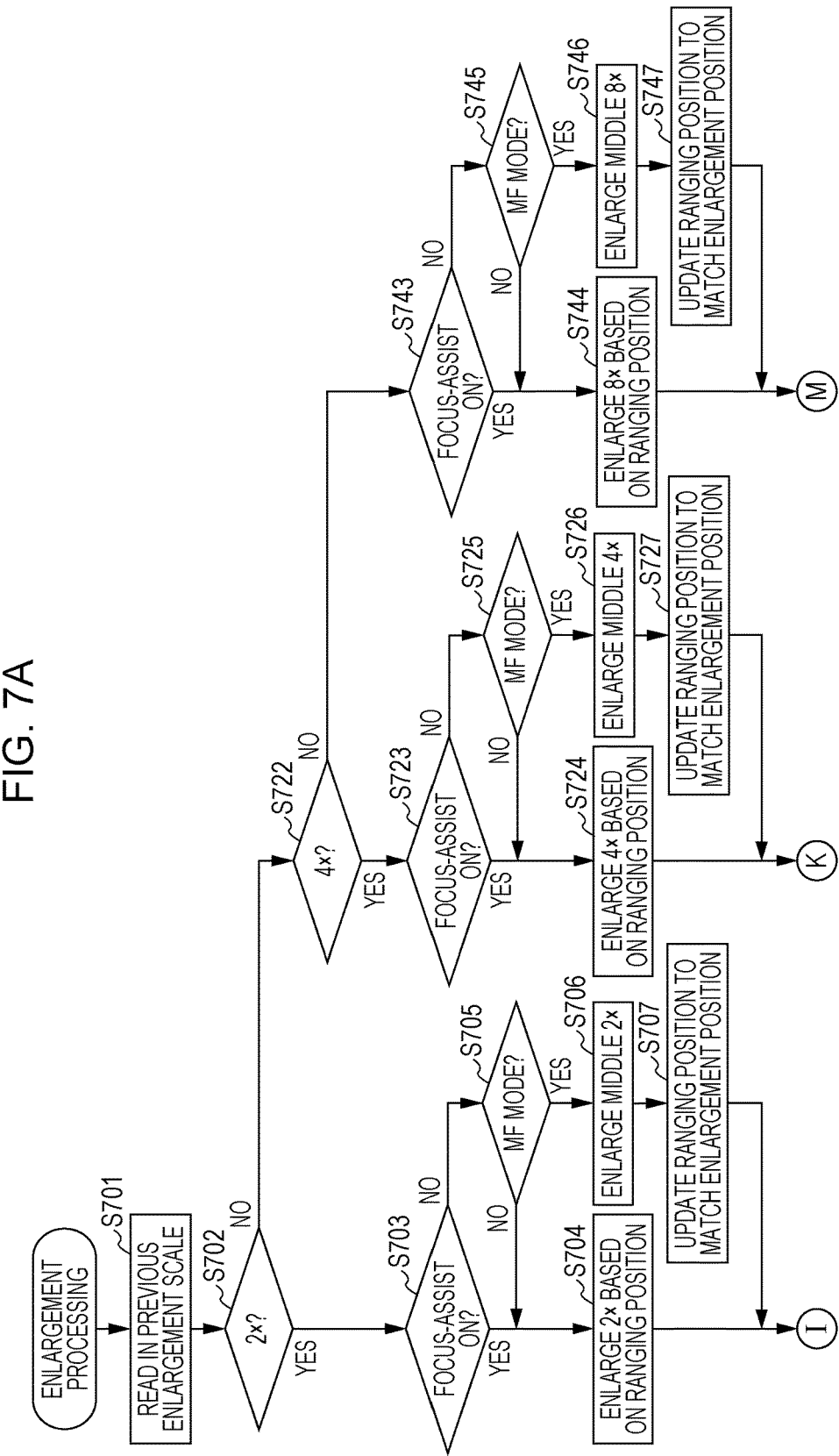
FIGS. 7A and 7B are a flowchart of enlargement processing.
Figure 7B:
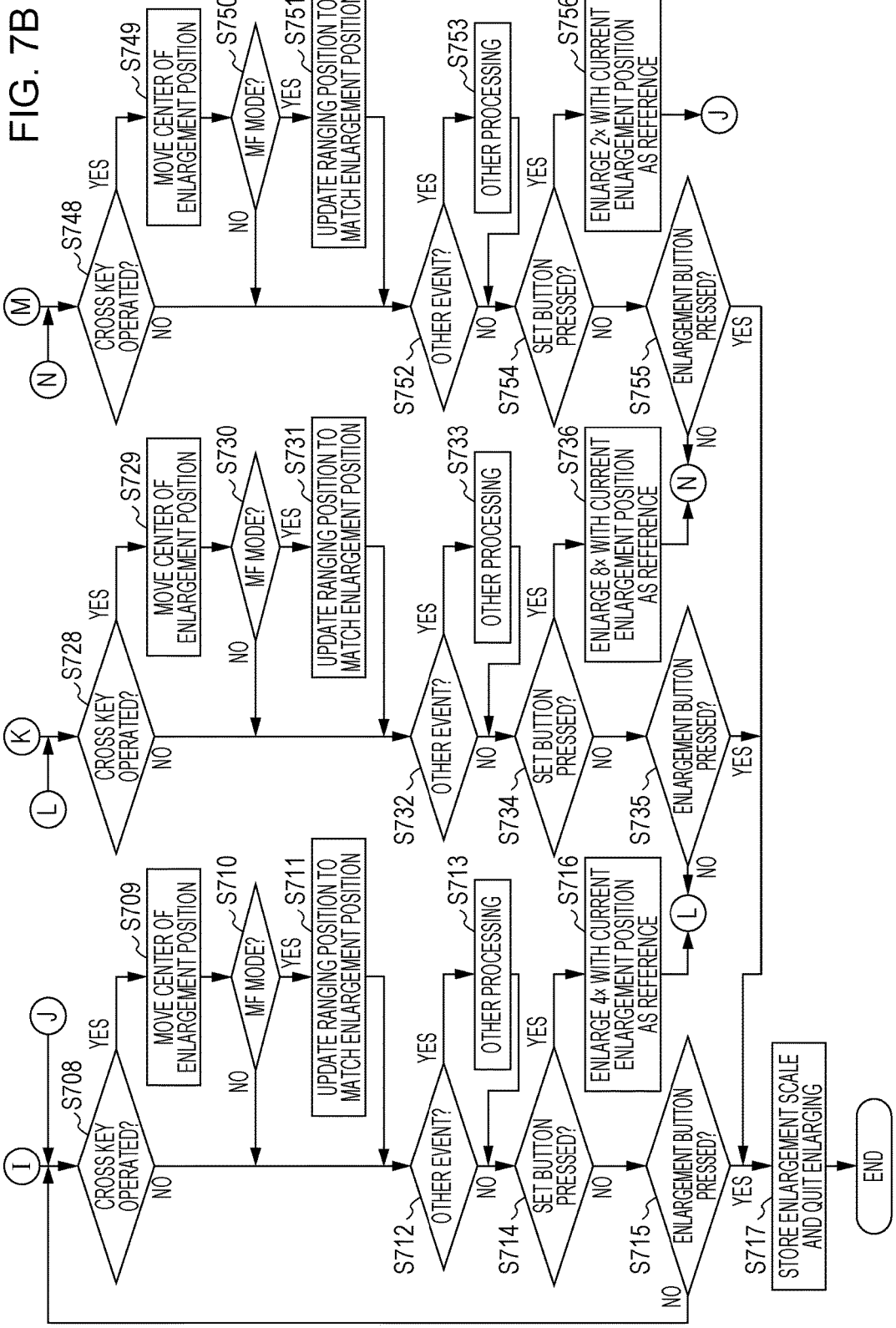

FIGS. 7A and 7B are a flowchart of the above-described enlarged display processing. This processing is the processing of S338 in FIG. 3D in detail.

In S701, the CPU 119a reads in the enlargement scale from the previous time of the enlargement mode, that is stored in the RAM 119c.

In S702, the CPU 119a determines whether the enlargement scale that has been read in is 2x or not. In a case where this is 2x, the flow advances to S703; otherwise, to S722.

In S703, the CPU 119a references settings information stored in the ROM 119b, and determines whether or not the focus-assist function is set to on. In a case where the focus-assist function is set to on, determination is made here that the focus-assist function is on. In a case where the focus-assist function is set to on, the flow advances to S704; otherwise, to S705.

In S704, the CPU 119a decides the enlargement range based on the current ranging position held in the RAM 119c, and displays the live view image enlarged to twice the scale of the normal scale on the display unit 107. Basically, the enlargement range is decided such that the ranging position is the center of the enlarged range. In a case where using the ranging position as the center of the enlarged range would cause the enlarged range to exceed the shooting range, a range is decided as the enlargement range that includes the ranging position but does not cross over outside of the shooting range. In any case, the enlarged display is performed so that the ranging position (center of ranging range) is included in the enlarged range, based on the ranging position. FIG. 13B described earlier is a display example of this. In the enlarged live view image in the enlargement mode (enlargement processing), the focus-assist is not displayed even if the focus-assist function is set to on. Thus, the focus-assist is prevented from impeding viewing the enlarged live view image when enlargement is being performed to confirm focus in detail.

In S705, the CPU 119a determines whether or not the focus mode has been set to MF by the AF/MF switch 135. If set to MF, the flow advances to S706; otherwise, i.e., if set to AF, the flow advances to S704.

In S706, the CPU 119a decides an enlargement range centered on the middle of the shooting range (the middle of the live view image at normal scale), and displays the live view image on the display unit 107 enlarged to a scale twice the normal scale. FIG. 13D described earlier is a display example of this.

Figure 13E:
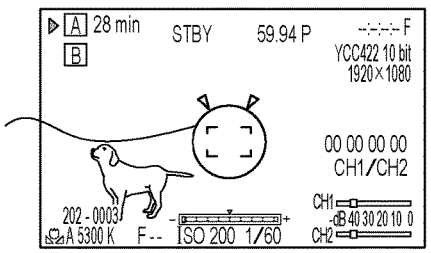

In S707, the CPU 119a updates the ranging position held in the RAM 119c in accordance with the enlargement position. That is to say, the middle of the shooting range (the middle of the live view image at normal scale) is set as the ranging position (the ranging position is set to a range where the center is the middle of the shooting range). Consequently, in a case where the enlargement mode is disengaged and the focus-assist is displayed, the position where the focus-assist is displayed is a different position from that in FIG. 13A before the enlargement processing was performed, as illustrated in FIG. 13E.

In S708 in FIG. 7B, the CPU 119a determines whether or not the cross key 125 has been operated (to accept enlargement range moving instructions). In a case where the cross key 125 has been operated, the flow advances to S709; otherwise, to S712.

In S709, the CPU 119a moves the enlargement center position in a direction corresponding to the key of the cross key 125 that has been operated. That is to say, the range displayed enlarged on the display unit 107 out of the shooting range is changed in accordance with the operation of the cross key 125 performed during the enlarged display.

In S710, the CPU 119a determines whether or not the focus mode has been set to MF by the AF/MF switch 135. If set to MF, the flow advances to S711; otherwise, i.e., if set to AF, the flow advances to S712.

In S711, the CPU 119a updates the ranging position held in the RAM 119c in accordance with the enlarged center position to which movement has been made in S709. That is to say, the ranging position is set as the center of the enlarged range after moving (the ranging range is changed to a range centered on the middle of the enlarged range after movement).

In S712, the CPU 119a determines whether or not another event has occurred. Examples of another event include pressing of the menu key 124, pressing of the start/stop key 133, operations to set various shooting parameters, and so forth. In a case where another event has occurred, the flow advances to S713; otherwise, to S714.

In S713, processing is performed in accordance with the other event that has occurred. In a case where the start/stop key 133 has been pressed, for example, recording of a moving image is started. That is to say, a moving image can be recorded even while in the enlarged display state.

In S714, the CPU 119a determines whether or not the set key 127 has been pressed. In a case where determination is made that the set key 127 has been pressed, the flow advances to S716; otherwise, to S715.

In S715, the CPU 119a determines whether or not the enlargement key 131 has been pressed. In a case where the enlargement key 131 has been pressed, the flow advances to S717; otherwise, returns to S708 and repeats the processing.

In S717, the current enlargement scale is stored in the RAM 119c, enlargement is disengaged (returned to the normal scale), and the processing ends. Note that the current enlargement scale may be stored in the ROM 119b that is non-volatile memory, rather than in the RAM 119c. This enables the enlargement mode to be started from the enlargement scale used the previous time, even after power cycling.

In S716, the CPU 119a changes the enlargement scale from 2x to 4x with the current enlargement position as a reference, and displays the live view image on the display unit 107.

In S722, the CPU 119a determines whether or not the enlargement scale read in S701 is 4x. In a case where the enlargement scale is 4x the flow advances to S723; otherwise (i.e., in a case where the enlargement scale is 8x), to S743.

S723 through S735 are the same processing as S703 through S715 except that the enlargement scale is 4x instead of 2x, so description will be omitted. In S736, the CPU 119a changes the enlargement scale from 4x to 8x and displays the live view image on the display unit 107, with the current enlargement position as a reference.

S743 through S755 are the same processing as S703 through S715 except that the enlargement scale is 8x instead of 2x, so description will be omitted. In S756, the CPU 119a changes the enlargement scale from 8x to 2x and displays the live view image on the display unit 107, with the current enlargement position as a reference.

Focus-Assist Display Processing in Enlargement Mode (Modification)

Although an example has been described where a focus-assist is not displayed in the enlarged live view image in the enlargement mode (enlargement processing) described with reference to FIGS. 7A, 7B, and 13A through 14C, this is not restrictive, and the focus-assist may be displayed in the enlargement mode. The following is a description of processing in a case of displaying the focus-assist on an enlarged display of the live view image.

First Modification

Figure 15A:
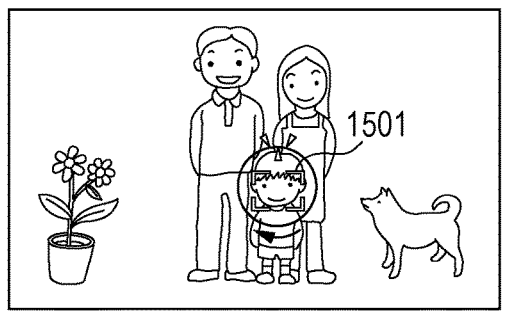
FIGS. 15A through 15D are first screen display examples for each enlargement scale.

A first modification relating to display of the focus-assist in the enlargement mode will be described with reference to FIGS. 15A through 15D. FIG. 15A is a display example on the display unit 107 in a case where the focus-assist function is on to display a focus-assist 1501 in a live view display at normal scale (normal field angle). In the focus-assist 1501, the square frame portion indicates the ranging position (ranging range), and the triangles on the ring indicate the defocus amount and the change in focus state due to focus movement. The arrow display beneath the ring indicates the direction in which to operate the focus ring 134.

Figure 15B:
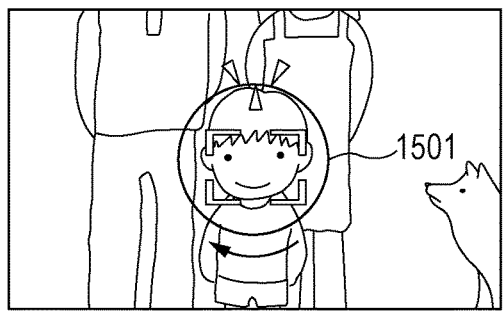

FIG. 15B is a display example in a case where an enlarged live view display is being performed in the enlargement mode with the enlargement scale at 2x, which is a modification of the display in S704 in FIG. 7A. The subject (live view image) is double size the normal scale, and the focus-assist 1501 also is displayed at double size. Although the display size of the focus-assist 1501 is double size, the live view image also is double size, so the region which the ranging position indicated by the rectangular portion of the focus-assist 1501 on the imaging device 102 is the same as in the normal scale.

Figure 15C:
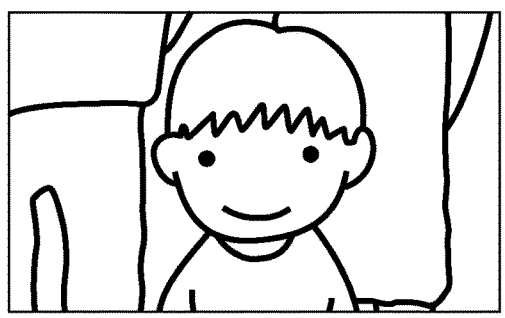

FIG. 15C is a display example in a case where an enlarged live view display is being performed in the enlargement mode with the enlargement scale at 4x, which is a modification of the display in S724 in FIG. 7A. The subject (live view image) is four times the size, and the focus-assist 1501 is hidden from display.

Figure 15D:
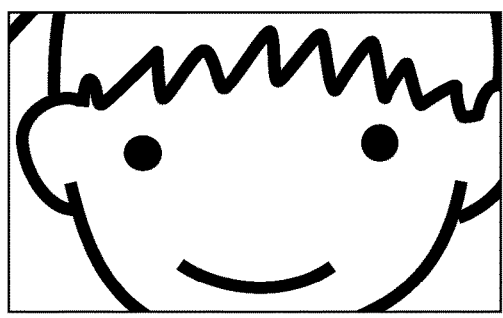

FIG. 15D is a display example in a case where an enlarged live view display is being performed in the enlargement mode with the enlargement scale at 8x, which is a modification of the display in S744 in FIG. 7A. The subject (live view image) is eight times the size, and the focus-assist 1501 is hidden from display.

Thus, in the first modification, the focus-assist is displayed in a case where the enlargement scale is 2x or lower, and is hidden from display when the enlargement scale exceeds 2x. As described above, when the live view image is enlarged, the size of the focus-assist on the live view image is also increased. Accordingly, if the display of the focus-assist is made to match the ranging range, the display size of the focus-assist also needs to be enlarged in accordance with the enlarge scale of the live view image. However, if this is performed, the triangles and ring portion of the focus-assist are outside of the display region of the display unit 107. Further enlarging will but even the rectangular frame of the focus-assist outside of the display region. This means that the focus-assist cannot be properly displayed. The user may also find it unnatural to operate manual focus with the size of the triangles and ring changed. The first modification can prevent this situation by hiding the focus-assist from display when the enlargement scale exceeds 2x.

Although display/non-display of the focus-assist is described as being switched using 2x as a threshold, this is not restrictive. In a case where the scale can be set to finer settings than just 2x, 4x, and 8x, display/non-display can be switched using the following calculation expressions.

With the horizontal address of the upper-left coordinate of the rectangular region of the frame portion of the focus-assist represented by x1, the vertical address by y1, the horizontal size by Width1, the vertical size by Height1, and the enlargement scale by N, the upper-left coordinates (x2, y2) and size (Width2, Height2) after enlarging can be calculated as follows.

$x2=x1-(Width1 \times N-Width1)/N$ $y2=y1-(Height1 \times N-Height1)/N$ $Width2=Width1 \times N$ $Height2=Height1 \times N$ Here, determination is made regarding whether one of x2 and y2, or one of x2+Width2 and y2+Height2 will be outside of the display region, and hiding from display in a case where the display will be outside of the display region enables cases where optional scales are set to be able to be handled as well.

Second Modification

Figure 16A:
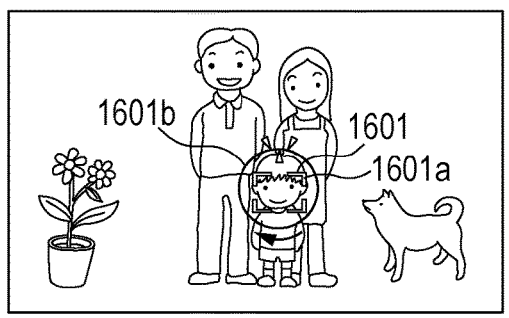
FIGS. 16A through 16D are second screen display examples for each enlargement scale.

A second modification relating to display of the focus-assist in the enlargement mode will be described with reference to FIGS. 16A through 16D. FIG. 16A is a display example on the display unit 107 in a case where the focus-assist function is on to display a focus-assist 1601 in a live view display at normal scale (normal field angle).

Figure 16B:
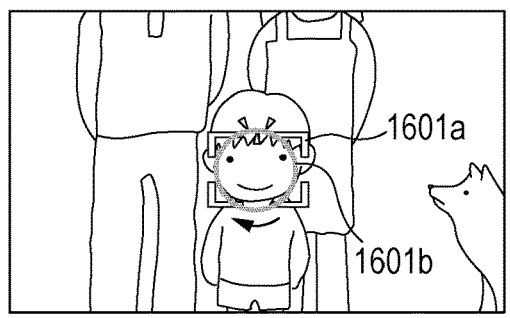

FIG. 16B is a display example in a case where an enlarged live view display is being performed in the enlargement mode with the enlargement scale at 2x, which is a modification of the display in S704 in FIG. 7A. The subject (live view image) is double size the normal scale, and a rectangular frame portion 1601a (indicating the ranging range) of the focus-assist 1601 also is displayed at double size. The ring that indicates the defocus amount and the change in focus state due to focus movement, the arrow indicating the direction in which to operate the focus ring 134, and the triangle portions 1601b, are displayed in the same size as in the normal scale, and are displayed in a translucent color so that the background live view image is visible.

Figure 16C:
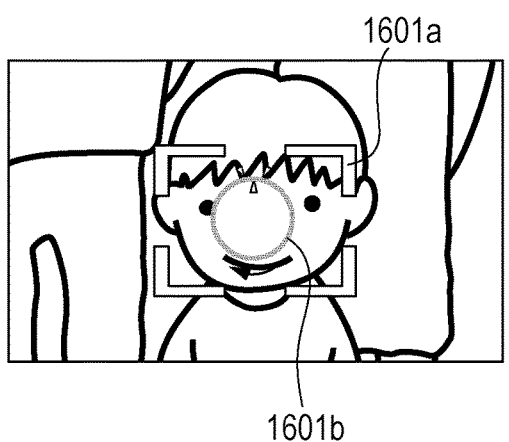

FIG. 16C is a display example in a case where an enlarged live view display is being performed in the enlargement mode with the enlargement scale at 4x, which is a modification of the display in S724 in FIG. 7A. The subject (live view image) is four times the size, and just the rectangular frame portion 1601a of the focus-assist 1601 is also displayed at four times the size. The ring, the arrow, and the triangle portions 1601b, are displayed in the same size as in the normal scale, and are displayed in a translucent color so that the background live view image is visible.

Figure 16D:
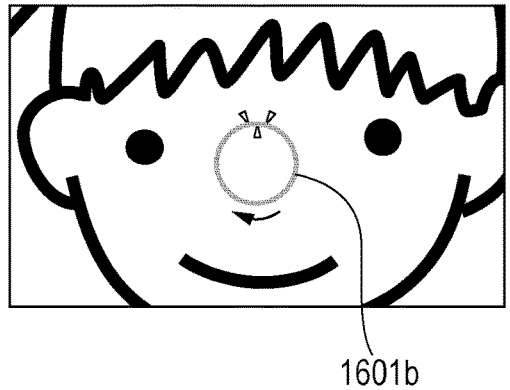

FIG. 16D is a display example in a case where an enlarged live view display is being performed in the enlargement mode with the enlargement scale at 8x, which is a modification of the display in S744 in FIG. 7A. The subject (live view image) is eight times the size, and just the rectangular frame portion 1601a of the focus-assist 1601 is hidden from view. The ring, the arrow, and the triangle portions 1601b, are displayed in the same size as in the normal scale, and are displayed in a translucent color so that the background live view image is visible.

According to the second modification, the rectangular frame portion 1601a is displayed enlarged in accordance with the enlargement scale, as long as the size of the ranging range in the live view image does not exceed the display region of the display unit 107, so the user can be made to accurately recognize the ranging range. On the other hand, the other portions 1601b are displayed in the same display size even if the live view image is enlarged, and displayed in a translucent color. Accordingly, the user can recognize the degree of in-focus, whether front focus or back focus, which direction the focus ring 134 should be rotated in, and so forth, without obstructing view of the live view display, thereby assisting manual focus operations of the user. Enlarged display is often used in cases where strict adjustment of focus is desired, so assisting manual focus operations in enlarged display as well, as in the second modification, is useful for the user.

Third Modification

Figure 17A:
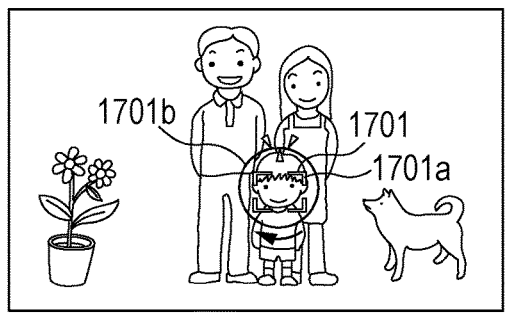
FIGS. 17A through 17D are third screen display examples for each enlargement scale.

A third modification relating to display of the focus-assist in the enlargement mode will be described with reference to FIGS. 17A through 17D. FIG. 17A is a display example on the display unit 107 in a case where the focus-assist function is on to display a focus-assist 1701 in a live view display at normal scale (normal field angle).

Figure 17B:
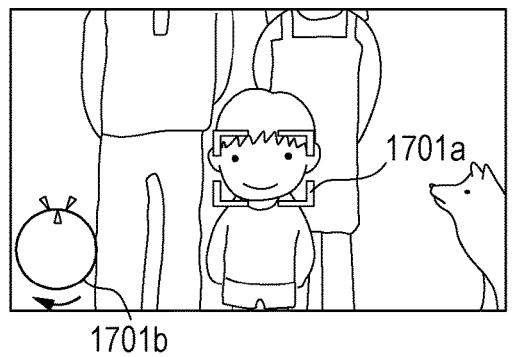

FIG. 17B is a display example in a case where an enlarged live view display is being performed in the enlargement mode with the enlargement scale at 2x, which is a modification of the display in S704 in FIG. 7A. The subject (live view image) is double size the normal scale, and a rectangular frame portion 1701a (indicating the ranging range) of the focus-assist 1701 also is displayed at double size. The portions other than the rectangular frame portion 1701a, i.e., the ring, the arrow, and the triangle portions 1701b, are displayed in the same size as in the normal scale, and are displayed at a display position to the lower left corner of the display region of the display unit 107, that is unrelated to the ranging position. By changing the display position of the portions 1701b other than the rectangular frame portion 1701a indicating the ranging range, these portions 1701b can be kept from obstructing the view of the center portion live view display (particularly the center portion of the ranging range).

Figure 17C:
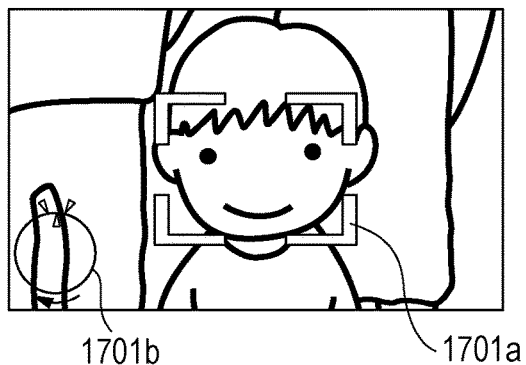

FIG. 17C is a display example in a case where an enlarged live view display is being performed in the enlargement mode with the enlargement scale at 4x, which is a modification of the display in S724 in FIG. 7A. The subject (live view image) is four times the size, and just the rectangular frame portion 1701a of the focus-assist 1701 is also displayed at four times the size. The ring, the arrow, and the triangle portions 1701b, are displayed in the same size as in the normal scale, and are displayed at a display position to the lower left corner of the display region of the display unit 107, that is unrelated to the ranging position.

Figure 17D:
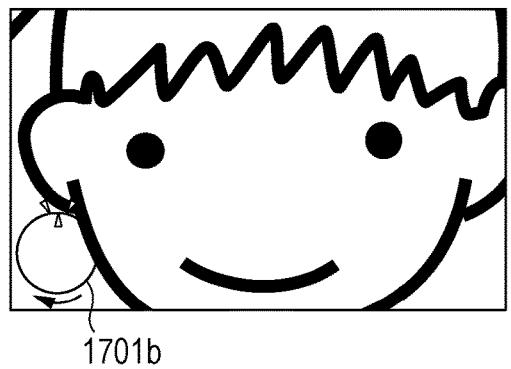

FIG. 17D is a display example in a case where an enlarged live view display is being performed in the enlargement mode with the enlargement scale at 8x, which is a modification of the display in S744 in FIG. 7A. The subject (live view image) is eight times the size, and just the rectangular frame portion 1701a of the focus-assist 1701 is hidden from view. The ring, the arrow, and the triangle portions 1701b, are displayed in the same size as in the normal scale, and are displayed at a display position to the lower left corner of the display region of the display unit 107, that is unrelated to the ranging position.

According to the third modification, the rectangular frame portion 1701a is displayed enlarged in accordance with the enlargement scale, as long as the size of the ranging range in the live view image does not exceed the display region of the display unit 107, so the user can be made to accurately recognize the ranging range. On the other hand, the other portions 1701b are displayed in the same display size even if the live view image is enlarged, and displayed with the display position thereof moved to a position where they do not overlap the ranging range. Accordingly, the user can recognize the degree of in-focus, whether front focus or back focus, which direction the focus ring 134 should be rotated in, and so forth, without obstructing view of the live view display, thereby assisting manual focus operations of the user. There is no need to display the portions 1701b in a transparent color since the position has been moved, so the visibility of the portions 1701b can be improved in comparison with the second modification. Enlarged display is often used in cases where strict adjustment of focus is desired, so assisting manual focus operations in enlarged display as well, as in the third modification, is useful for the user.

Display arrangements of the focus-assist described in the first through third modifications are not restricted to these, and any of the display arrangements described in FIGS. 8A through 10C may be used as well. A restriction may be set regarding a scale to which enlargement can be performed, based on whether the focus-assist function is set to on or off, besides the first through third modifications. For example, in a case where the focus-assist function is off, 2x, 4x, and 8x may be used in a case where the focus-assist function is set to off. On the other hand, an arrangement may be made where 4x and 8x cannot be set in a case where the focus-assist function is set to off (no resizing to 4x or 8x is performed even if a scale changing operation is performed such as pressing the set key 127). Other Modifications Note that the various types of control described above as being carried out by the CPU 119a may be executed by one hardware arrangement, or may be shared among multiple arrangements, to control the overall apparatus.

Although the present invention has been described by way of preferred embodiments, the present invention is not restricted to these particular embodiments, and various arrangements that do not depart from the essence of the present invention are included within the present invention. Further, the above-described embodiments only exemplify one way of carrying out the present embodiment, and the embodiments may be combined as suitable.

Although an example has been described in the above embodiments where the present invention has been applied to the digital camera 10, this example is not restrictive, and the present invention is applicable to any display control device that can display focus information relating to a ranging position. The present invention is not restricted to a digital camera having an imaging device in a main body like described above, and is also applicable to an apparatus that does not have an imaging sensor itself in a main unit, but can remotely receive live view images imaged at an external imaging apparatus, and display focus information relating to a ranging position. The present invention is applicable to display control in remote shooting using a smartphone or tablet PC or the like connected to an imaging apparatus wirelessly or by cable, for example. thus, the present invention is applicable to personal computers, personal digital assistants (PDAs), cellular phone terminals and portable image viewers, music players, gaming consoles, electronic book readers, and so forth.

The present invention can be realized by supplying a program that realizes one or more functions of the above embodiments to a system or apparatus via a network or storage medium, and one or more processors at the system or apparatus reading out and executing the program. The present invention may also be realized by a circuit that realizes one or more functions (e.g., an application-specific integrated circuit (ASIC)).

According to the above-described embodiments, a guide display for the degree of in-focus can be realized where visibility of a subject is obscured less.

Also, according to the above-described embodiments, a guide display for the degree of in-focus can be realized more suitably in accordance with the operating state of AF.

Also, according to the above-described embodiments, when switching from an operating mode that is not crop mode, to crop mode, information of focus regarding a suitable position in the crop mode can be displayed.

Also, according to the above-described embodiments, information relating to focus can be suitably displayed even in a case of enlarged display of a live view image.

Also, according to the above-described embodiments, when performing enlarged display of a live view image on an apparatus that is capable of displaying information relating to focus, enlarged display of an enlarged range more suitable for the user can be performed in accordance with the situation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-077206, 2015-077207, 2015-077208, 2015-077209, and 2015-077210, filed Apr. 3, 2015, which are hereby incorporated by reference herein in their entirety.

What is claimed is:

1. A display control apparatus comprising:
at least one memory storing executable instructions; and
at least one processor coupled to the at least one memory and configured to execute the executable instructions to cause the display control apparatus to implement:
a display control unit configured to display a live view image being imaged by an imaging unit, and to display a display item indicating a degree of in-focus, superimposed on the live view image;
a moving unit configured to move a display position of the display item on the live view image based on a user operation;
an acquiring unit configured to acquire information relating to a degree of in-focus in a focus detecting region based on the display position of the display item; and
a changing unit configured to:
when a subject at the focus detecting region is not in focus, change display positions and display forms of a first indicator and second indicator that indicate a degree of in-focus by a positional display relationship with each other, and a third indicator that indicates a focus position, based on information acquired by the acquiring unit, wherein the first indicator and the second indicator and the third indicator are included in the display item; and
when a subject at the focus detecting region is in focus, change display forms of the first indicator and the second indicator into one integrated indicator, and the display position of the integrated indicator to a position indicated by the third indicator.

2. The display control apparatus according to claim 1, wherein the changing unit further changes a display distance between the first indicator and the second indicator in accordance with the degree of in-focus, based on information acquired by the acquiring unit, such that the display distance is smaller regarding a case where the difference from in-focus is small in comparison with a case where the difference from in-focus is large.

3. The display control apparatus according to claim 1, wherein the display control unit is further configured to:
display a display element representing information relating to shooting, superimposed on the live view image; and
in a case where the display element and one of the indicators included in the display item are to be overlaid in the same position, control to superimpose the display element on top of the one of the indicators.

4. The display control apparatus according to claim 1, wherein the acquiring unit further acquires information indicating which of in-focus, front focus, and back focus, the current focus state is,
and wherein the changing unit changes the form of the indicators included in the display item depending on whether the current focus state is front focus or back focus, based on information acquired by the acquiring unit.

5. The display control apparatus according to claim 4, wherein the acquiring unit further acquires information indicating whether which of in-focus, front focus, and back focus, the current focus state is, has been determined,
and wherein the changing unit changes the form of the indicators included in the display item depending on whether which of in-focus, front focus, and back focus, the current focus state is has been determined, or has not been determined, on the information acquired by the acquiring unit.

6. The display control apparatus according to claim 1, wherein at least one processor is further configured to execute the executable instructions to cause the display control apparatus to implement an operating unit configured to accept manual focus operation by a user.

7. The display control apparatus according to claim 6, wherein the display item includes a display that indicates an operation direction in which the operating unit is to be operated toward the in-focus direction.

8. A control method of a display control apparatus, the method comprising:
a display control step of displaying a live view image being imaged by an imaging unit, and displaying a display item indicating a degree of in-focus, superimposed on the live view image;
a moving step of moving a display position of the display item on the live view image based on a user operation;
an acquiring step of acquiring information relating to a degree of in-focus in a focus detecting region based on the display position of the display item; and
a changing step of:

when a subject at the focus detecting region is not in focus, changing display positions and display forms of a first indicator and second indicator that indicate a degree of in-focus by a positional display relationship with each other, and a third indicator that indicates a focus position, based on information acquired in the acquiring step, wherein the first indicator and the second indicator and the third indicator are included in the display item; and when a subject at the focus detecting region is in focus, changing display forms of the first indicator and the second indicator into one integrated indicator, and the display position of the integrated indicator to a position indicated by the third indicator.

9. A computer-readable non-transitory storage medium storing a program to cause a computer to perform a display control method, the display control method comprising:

a display control step of displaying a live view image being imaged by an imaging unit, and displaying a display item indicating a degree of in-focus, superimposed on the live view image;

a moving step of moving a display position of the display item on the live view image based on a user operation;

an acquiring step of acquiring information relating to a degree of in-focus in a focus detecting region based on the display position of the display item and on phase detection signals output from pixels of the imaging unit corresponding to the focus detecting region; and a changing step of:

changing display positions and display forms of a first indicator and second indicator that indicate a degree of in-focus by a positional display relationship with each other, and a third indicator that indicates a focus position, based on information acquired in the acquiring step, wherein the first indicator and the second indicator and the third indicator are included in the display item; and when a subject at the focus detecting region is in focus, changing display forms of the first indicator and the second indicator into one integrated indicator, and the display position of the integrated indicator to a position indicated by the third indicator.

* * * * *